United States Patent
Bercovich et al.

(10) Patent No.: US 10,306,613 B2
(45) Date of Patent: May 28, 2019

(54) DYNAMIC CHANNEL ALLOCATION

(71) Applicant: Ceragon Networks Ltd., Tel-Aviv (IL)

(72) Inventors: Dudu Bercovich, Kfar-Saba (IL); Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 119 days.

(21) Appl. No.: 15/180,145

(22) Filed: Jun. 13, 2016

(65) Prior Publication Data
US 2017/0013632 A1   Jan. 12, 2017

Related U.S. Application Data

(60) Provisional application No. 62/189,806, filed on Jul. 8, 2015.

(51) Int. Cl.
*H04W 72/04* (2009.01)
*H04L 5/00* (2006.01)

(52) U.S. Cl.
CPC .......... *H04W 72/042* (2013.01); *H04L 5/006* (2013.01)

(58) Field of Classification Search
CPC ..... H04W 74/00; H04W 74/04; H04W 72/06; H04W 72/12; H04W 74/0808; H04W 74/08; H04W 16/04; H04W 16/06; H04W 16/10; G05B 2219/31187; G05B 2219/31188; G05B 2219/25226
See application file for complete search history.

(56) References Cited

U.S. PATENT DOCUMENTS

| | | | | |
|---|---|---|---|---|
| 6,006,073 A | * | 12/1999 | Glauner | H04L 1/0001 375/220 |
| 8,416,693 B2 | | 4/2013 | Vanunu et al. | |
| 9,661,579 B1 | * | 5/2017 | Zhang | H04W 52/04 |
| 2006/0182145 A1 | * | 8/2006 | Seo | H04B 7/2631 370/471 |
| 2009/0310527 A1 | * | 12/2009 | Rao | H04W 92/20 370/315 |
| 2009/0323608 A1 | * | 12/2009 | Adachi | H04W 48/18 370/329 |
| 2011/0317742 A1 | * | 12/2011 | Kawahatsu | H04L 1/0003 375/132 |
| 2013/0003591 A1 | * | 1/2013 | Novak | H04W 72/085 370/252 |
| 2013/0279635 A1 | * | 10/2013 | Bhardwaj | H03G 3/3036 375/345 |

(Continued)

*Primary Examiner* — Mohamed A Kamara

(57) ABSTRACT

A method for a network controller to carry out automatic channel allocation for a network of wireless communication links between communication nodes, the method including determining an estimated signal attenuation between communication nodes in a network, allocating wireless channels, determined by a set of transmission parameters, to a plurality of wireless communication links in the network, based, at least in part, on the estimated signal attenuation, sending a message to a first communication node, the message instructing the first communication node to use a set of transmission parameters for communicating a first wireless communication link connecting the first communication node to a second communication node at an opposite end of the first wireless communication link, the transmission parameters based, at least in part, on the allocating wireless channels. Related apparatus and methods are also described.

31 Claims, 14 Drawing Sheets

(56) References Cited

U.S. PATENT DOCUMENTS

| | | | | |
|---|---|---|---|---|
| 2014/0126514 A1* | 5/2014 | Tang | ............... | H04W 24/02 370/329 |
| 2014/0226574 A1* | 8/2014 | Guo | ............... | H04W 16/10 370/329 |
| 2014/0328423 A1* | 11/2014 | Agee | ............... | H04B 7/0413 375/267 |
| 2015/0055563 A1* | 2/2015 | Zhu | ............... | H04W 52/243 370/329 |

* cited by examiner

DYNAMIC CHANNEL ALLOCATION

RELATED APPLICATION

This application claims the benefit of priority under 35 USC 119(e) of U.S. Provisional Patent Application No. 62/189,806 filed on Jul. 8, 2015, the contents of which are incorporated herein by reference in their entirety.

FIELD AND BACKGROUND OF THE INVENTION

The present invention, in some embodiments thereof, relates to a method of managing transmission parameters in a multi-link wireless transmission network and, more particularly, but not exclusively, to a method of managing transmission frequencies in a multi-link wireless transmission network.

Wireless point-to-point communication systems are often deployed as cellular network backhaul. They usually require a line-of-sight (LOS) and a regulated frequency to ensure high availability throughout the year with little or no interference. A required bit-error-rate in such links is typically below $10^{-13}$. Frequency bands commonly used are in the range between 7 GHz and 38 GHz. Higher frequency bands are constantly being proposed and standardized as spectrum resources are scarce.

Since communication in such cases is done as a wireless point-to-point link between two nodes in a network, transmission beams are typically generated using dish antennas which provide some gain and reduce interference. However, narrow beams emitted from dish antennas may still generate interference in other wireless links which use the same frequency, especially when the other links are in a similar direction.

As a rule of thumb, when two wireless links are used for communication with radio beams using same polarization, a different frequency channel is assigned to each of them if the angular separation between them is below 120 degrees. If orthogonal polarizations are used, a 90 degree angular separation is required before different frequency channels are assigned.

Reference is now made to FIG. 1, which is a simplified illustration of angular separation and interference between two wireless communication links in a prior art wireless communication system.

FIG. 1 depicts a first link 101 between two dish antennas 102 103, and a second link 105 between two dish antennas 106 107. An angle 110 is depicted as an angular separation between the two links 101 105.

Transmission from the dish antenna 107 may be received as interference 120 in the dish antenna 102. Transmission from the dish antenna 103 may be received as interference in the dish antenna 106 (not shown). As a matter of fact, transmission from any one of the dish antennas 102 103 106 107 may be received as interference in any one of the other unintended dish antennas 102 103 106 107.

Additional background art includes:

U.S. Pat. No. 8,416,693 to Vanunu et al.

The disclosures of all references mentioned above and throughout the present specification, as well as the disclosures of all references mentioned in those references, are hereby incorporated herein by reference.

SUMMARY OF THE INVENTION

Point-to-point wireless transmission networks are typically set up by assigning permanent frequencies to each point-to-point wireless link, typically using rules-of-thumb such as described above in the Background section. The rules of thumb typically ensure specific bandwidths to each one of the point-to-point links, typically including a large safety factor, and then the transmission parameters of the point-to-point transmission network are not adjusted any more, or at least the transmission frequencies are not adjusted any more. In some networks, some transmission parameters may be negotiated between a transmitter and a receiver of a single link, such as a change in coding modulation to improve resistance to interference, but not the frequency used for the link.

According to an aspect of some embodiments of the present invention there is provided a method for automatic channel parameter allocation for a network of wireless communication links between communication nodes is used, which involves estimating wireless signal attenuation between the communication nodes and optionally allocating transmission channel parameters for the communication links such that mutual interference between the communication links is below a threshold and/or optimized for the network.

In some embodiments, transmission channel quality is monitored for the transmission channels, and transmission channel parameters are optionally changed dynamically such that mutual interference between the communication links is below a threshold, taking into account potentially changing transmission channel quality.

In some embodiments a module for optimizing transmission parameters in a multi-link multi-channel wireless network is provided in order to allocate transmission channel parameters to the wireless links, and optionally transmit the transmission channel parameters to the wireless links, for potentially changing the transmission channel parameters in the wireless links.

In some embodiments switching transmission parameters in the multi-link multi-channel wireless network is optionally performed errorlessly and hitlessly, optionally as described in above-mentioned U.S. Pat. No. 8,416,693.

The term "automatic" in all its grammatical forms is used throughout the present specification and claims to mean "performed by circuitry" or "performed by a computer" and their corresponding grammatical forms.

The term "dynamic" in all its grammatical forms is used throughout the present specification and claims to mean a change in transmission and/or reception parameters performed to an established communication network.

According to an aspect of some embodiments of the present invention there is provided a method for a network controller to carry out automatic channel allocation for a network of wireless communication links between communication nodes, the method including determining an estimated signal attenuation between communication nodes in a network, allocating wireless channels, determined by a set of transmission parameters, to a plurality of wireless communication links in the network, based, at least in part, on the estimated signal attenuation, sending a message to a first communication node, the message instructing the first communication node to use a set of transmission parameters for communicating a first wireless communication link connecting the first communication node to a second communication node at an opposite end of the first wireless communication link, the transmission parameters based, at least in part, on the allocating wireless channels.

According to some embodiments of the invention, the network of wireless communication links includes a cellular backhaul network.

According to some embodiments of the invention, a plurality of wireless communication links in the network use a same frequency. According to some embodiments of the invention, a plurality of wireless communication links in the network use a same set of transmission parameters.

According to some embodiments of the invention, the determining estimated signal attenuation between a plurality of wireless communication nodes in the network includes receiving a report from the second communication node in the network, the report including data describing attenuation of a signal on a wireless communication link between the first communication node and the second communication node, and the network controller determining estimated signal attenuation over the wireless communication link between the first communication node and the second communication node based, at least in part, on the report.

According to some embodiments of the invention, further including, upon making a determination that the estimated signal attenuation between the first communication node and the second communication node is greater than a threshold, sending a message to the first communication node to change transmission parameters of the wireless communication link between the first communication node and the second communication node so as to improve a signal-to-noise ratio between the first communication node and the second communication node.

According to some embodiments of the invention, the sending a message includes sending a message to the first communication node to split a communication channel between the first communication node and the second communication node into two non-overlapping communication channels.

According to some embodiments of the invention, further including receiving a report from a third communication node, the third communication node not connected by an intended wireless communication link to the first communication node, the report including data describing attenuation of a signal from the first communication node and received by the third communication node, making a determination that the attenuation between the first communication node and the third communication node is lower than a threshold.

According to some embodiments of the invention, further including sending a message to the first communication node to change transmission parameters of the wireless communication link between the first communication node and the second communication node so as to increase attenuation between the first communication node and the third communication node.

According to some embodiments of the invention, further including sending a message to the first communication node to split a communication channel between the first communication node and the second communication node into two non-overlapping communication channels.

According to some embodiments of the invention, further including sending a message to the third communication node to switch to a communication scheme which is less sensitive to interference.

According to some embodiments of the invention, switching to a communication scheme which is less sensitive to interference is performed by changing at least one of the following communication parameters reducing a constellation size, and reducing a coding rate.

According to some embodiments of the invention, the allocating channels is based, at least in part, on setting mutual interference between the wireless communication links below a threshold level.

According to some embodiments of the invention, the allocating channels is based, at least in part, on minimizing mutual interference between a plurality of the wireless communication links.

According to some embodiments of the invention, the determining estimated signal attenuation over a plurality of wireless communication links between a plurality of communication nodes is based on using at least one parameter selected from a group consisting of transmitter antenna shape, receiver antenna shape, transmitter antenna model, receiver antenna model, transmitter antenna diameter, receiver antenna diameter, angle of receiver antenna from direction of transmission of transmitter antenna, angle of receiver antenna direction from direction of transmission of transmitter antenna, power of transmission signal, modulation of signal, polarization of signal, frequency band, geographic region, and real-time weather information.

According to some embodiments of the invention, the allocating channels includes dynamic allocation, and further including instructing at least one of the wireless communication links to change a transmission parameter in the wireless communication link, thereby decreasing mutual interference between at least one pair of wireless communication links in the network of wireless communication links.

According to some embodiments of the invention, further including receiving a report of a change in signal quality in a wireless communication link from a communication node in the network, re-allocating channels in the network of wireless communication links depending on the change in signal quality, and instructing at least one of the wireless communication nodes to change a transmission parameter in the wireless communication link based on the re-allocating channels.

According to some embodiments of the invention, the report includes data indicating which transmitter interferes with reception of a channel allocated to a wireless communication link associated with the communication node.

According to some embodiments of the invention, further including transmitting identifying codes by respective transmitters in the communication nodes, therewith to identify which of the respective transmitters interfere with reception of a channel allocated to the first communication node.

According to some embodiments of the invention, the determining estimated signal attenuation between the communication nodes further includes storing attenuation values in a matrix in which an element $(i, j)$ of the matrix represents attenuation between a transmitting communication node $i$ and a receiving communication node $j$.

According to some embodiments of the invention, further including reporting a change in signal quality at a communication node, and updating a corresponding value in the matrix.

According to some embodiments of the invention, the transmission parameters include one from a list consisting of transmission frequency, transmission power, direction of transmission polarization, modulation scheme, and error-correction code.

According to some embodiments of the invention, the first communication node receiving the message coordinates channel switching with the second communication node to avoid loss of transmitted data.

According to some embodiments of the invention, the first communication node receiving the message coordinates channel switching with the second communication node to avoid loss of synchronization.

According to some embodiments of the invention, further including, adding a new channel to the plurality of wireless communication links, determining a new set of transmission parameters for use in the new channel, sending a message to at least one communication node, the message instructing the communication node to use the new set of transmission parameters for communicating on the new channel.

According to some embodiments of the invention, further including removing a channel from the plurality of wireless communication links, calculating estimated signal attenuation between a remainder of the plurality of wireless communication links, determining at least one new set of transmission parameters for use in at least one channel in the plurality of wireless communication links, and sending a message to a communication node, the message instructing the communication node to use the new set of transmission parameters in the at least one channel in the plurality of wireless communication links.

According to some embodiments of the invention, further including the first communication node switching transmission parameters for communicating on the first wireless communication link errorlessly, based, at least in part, on the message instructing the first communication node to use the set of transmission parameters.

According to some embodiments of the invention, further including the first communication node switching transmission frequency for communicating on the first wireless communication link errorlessly, based, at least in part, on the message instructing the first communication node to use the transmission frequency.

According to an aspect of some embodiments of the present invention there is provided a channel allocation control unit for automatic channel allocation for a network of wireless communication links between communication nodes, including a signal attenuation unit for estimating signal attenuation between a plurality of communication nodes in a network, a signal attenuation storage unit for storing values of estimated signal attenuation between the plurality of communication nodes in the network, a channel allocator arranged to allocate channels to a plurality of wireless communication links between the plurality of communication nodes based on values stored in the signal attenuation storage unit, and a communication unit arranged for communication with the plurality of communication nodes in the network of wireless communication links, configured to send instructions to respective ones of the communication nodes, the instructions defining which channels to use in the respective wireless communication links.

According to some embodiments of the invention, further including means for switching channels errorlessly.

According to some embodiments of the invention, further including means for switching channel carrier frequencies errorlessly.

According to an aspect of some embodiments of the present invention there is provided a method for automatic channel allocation for a plurality of wireless communication links between a plurality of communication nodes, including entering values in a transmission attenuation table in a network controller with table elements such that a table element (i, j) represents estimated transmission attenuation between a transmitting communication node i and a receiving communication node j, allocating channels to the plurality of wireless communication links based, at least in part, on corresponding entries in the transmission attenuation table, sending a message to a first communication node, the message instructing the first communication node to use one of the allocated channels for communicating on a wireless communication link connecting the first communication node to a second communication node.

According to some embodiments of the invention, further including providing a digital representation of a map of locations of the plurality communication nodes, providing at least one digital representation of a graph of power transmission as a function of angle for a transmission antenna over the plurality of wireless communication links, and in which the network controller determines estimated signal attenuation between a plurality of wireless communication links based, at least in part, on the digital representation of the graph and the digital representation of the map.

According to an aspect of some embodiments of the present invention there is provided a non-transitory computer-readable medium containing instructions for a method of automatic channel allocation for a network of wireless communication links between communication nodes according to the methods described herein.

Unless otherwise defined, all technical and/or scientific terms used herein have the same meaning as commonly understood by one of ordinary skill in the art to which the invention pertains.

Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a method of managing transmission parameters in a multi-link point-to-point transmission network and, more particularly, but not exclusively, to a method of managing transmission frequencies in a multi-link point-to-point transmission network.

Figure 1:
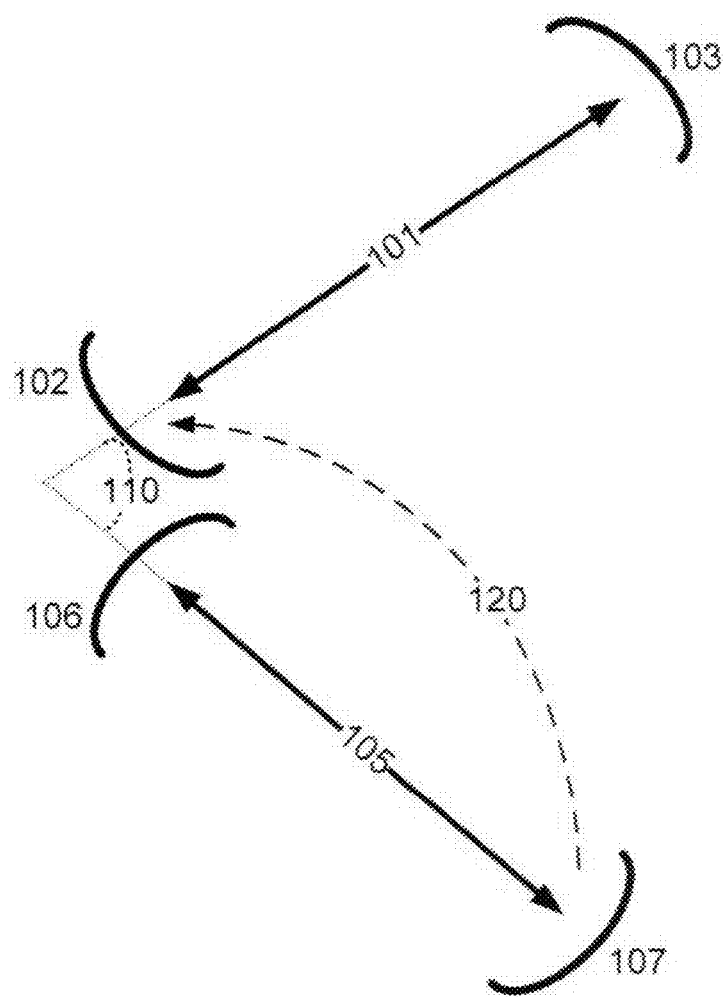
FIG. 1 is a simplified illustration of angular separation and interference between two communication links in a prior art wireless communication system.

In setting up a multi-link, multi-node, point-to-point communication network such as illustrated very simply in FIG. 1, the setup usually includes a large safety margin between communication links.

In practice, much of the time, for example when the sky is clear, there is no need for an angular separation as high as mentioned in the Background section above. Antenna radiation patterns typically ensure that interference is sufficiently low even when separation angles are lower than stated above.

An aspect of some embodiments of the invention includes determining a set of values of estimated signal attenuation over wireless communication links between communication nodes in a network, and a set of values of estimated signal attenuation between communication nodes not on opposite ends of a wireless communication link, and allocating wireless channels based on the estimated signal attenuation.

In some embodiments, the estimated signal attenuations are kept in memory and/or in a table of the estimated signal attenuations over the wireless communication links.

An aspect of some embodiments includes having a network controller sending a message to the communication nodes, instructing the communication node which channel, and/or which set of transmission parameters, to use for communicating on each wireless communication links connecting the communication nodes.

An aspect of some embodiments includes switching transmission parameters in the multi-link multi-channel wireless network is optionally performed errorlessly and hitlessly, optionally as described in above-mentioned U.S. Pat. No. 8,416,693.

An aspect of some embodiments includes determining the estimated signal attenuation based on information from data sheets describing signal attenuation data for antennas in the network, and a geometric relation between the direction of the antennas.

An aspect of some embodiments includes determining the estimated signal attenuation based on reports of signal attenuation sent by communication nodes, and ultimately received by a central network controller.

In some embodiments the wireless communication network is a cellular backhaul network.

Figure 2:
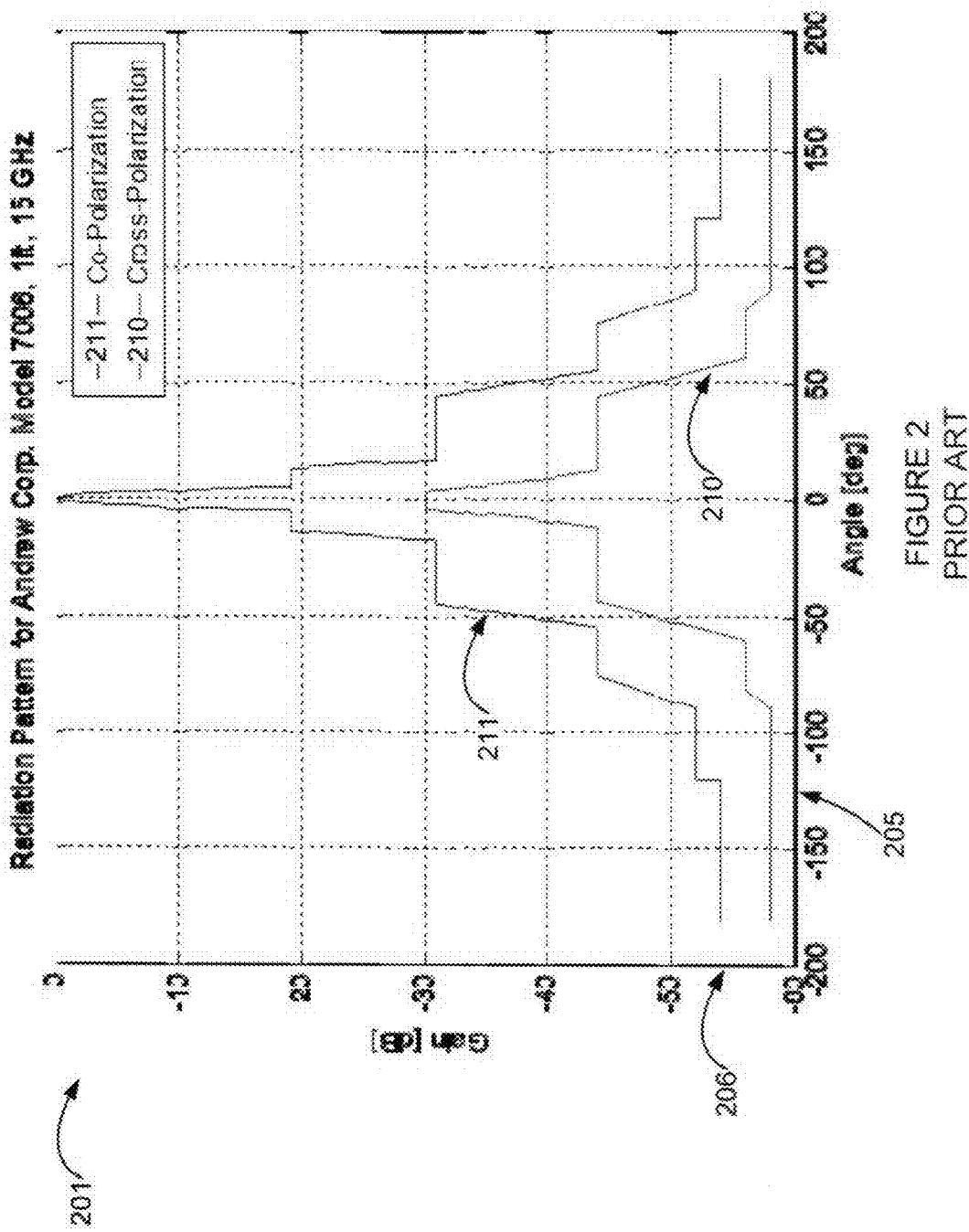
FIG. 2 is a prior art graph of power transmission as a function of angle in an example 1 foot diameter Andrew dish antenna.

Reference is now made to FIG. 2, which is a prior art graph 201 of power transmission as a function of angle in an example 1 foot diameter Andrew dish antenna.

FIG. 2 depicts the graph 201 of a radiation pattern mask of a 1 foot diameter Andrew dish antenna. The graph of FIG. 2 has an X-axis 205 in units of degrees from the main direction of the dish, and a Y-axis 206 of power gain in units of dB. The graph 201 includes two lines—a first line 211 depicting received power as a function of angle from a direction to which the antenna points, for a co-polarized receiver, and a second line 210 depicting received power as a function of angle for a cross-polarized receiver.

FIG. 2 implies that for cross-polarized channels, mutual interference becomes minimal for separation angles above 90 degrees, while for co-polarized channels minimal interference is obtained for separation angles above 120 degrees.

It appears that the cost of using the above-mentioned rule of thumb in setting up wireless communication links causes a lower-than-necessary frequency reuse (use of same frequencies in neighboring links) and less available bandwidth.

Often, an interference level of −45 dB is acceptable between links. In such cases, for example, the required angular separation is only 10 degrees for cross-polarization signals and 55 degrees for co-polarization systems.

One reason for the large safety margin is that the received signals are not always equally attenuated. If, for example, there is a fading on one of the links, a receiver on that link might suffer from interference from a transmission on another link, possibly less attenuated.

Figure 3:
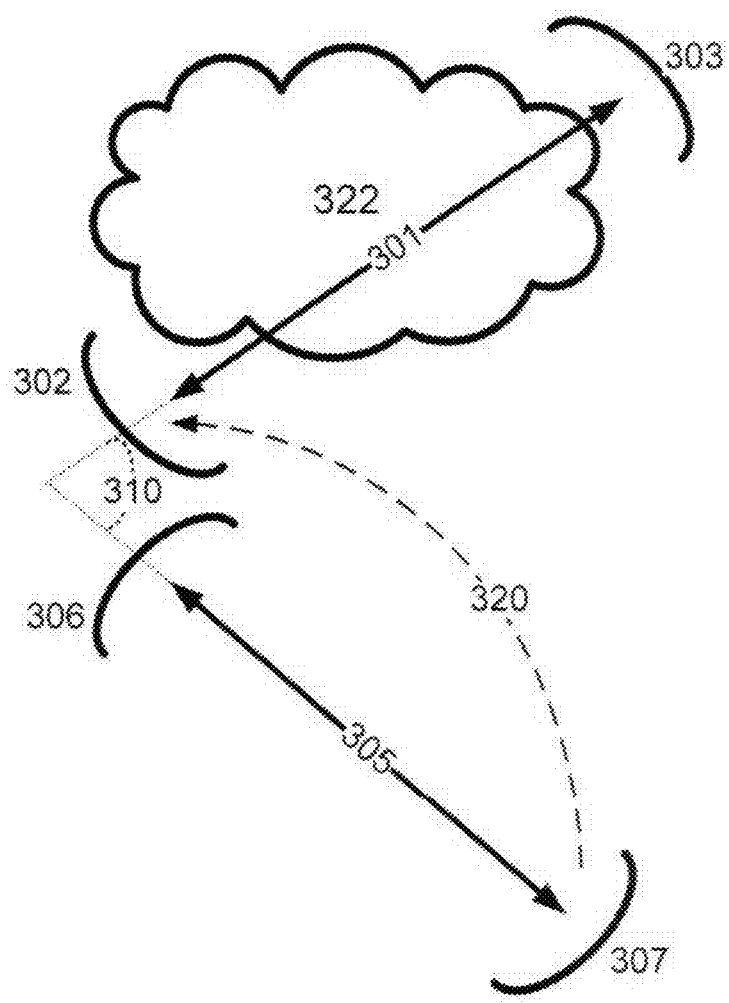
FIG. 3 is a simplified prior art illustration of an effect of attenuation on interference between two communication links.

Reference is now made to FIG. 3, which is a simplified prior art illustration of an effect of attenuation on interference between two communication links.

FIG. 3 depicts a first link 301 between two dish antennas 302 303, and a second link 305 between two dish antennas 306 307. An angle 310 is depicted as an angular separation between the two links 301 305.

FIG. 3 is similar to FIG. 1, with an addition of a cause of attenuation, for example rain 322, on a link between two dish antennas, for example on link 301 between the two dish antennas 302 303.

Relative to the situation depicted in FIG. 1, which showed no special cause for attenuation on link 301, FIG. 3 depicts a special cause for attenuation between dish antenna 303 and dish antenna 301, significantly attenuating the signals dish antenna 302 receives from dish antenna 301. Transmission from the dish antenna 307 may be received as interference 320 in the dish antenna 302, and the interference 320 may be closer in power to the signal which the dish antenna 302 receives from the dish antenna 301.

A prior art solution to the occasional attenuation situations can be to make sure there is enough leeway in the link budget for dealing with a relatively larger interference. However, such an approach leads to a large waste of spectral resources, because usually such fading occurs only in a small fraction of the time. Moreover, if fading occurs also over the path of the interfering signal, the need for increased interference resistance is cancelled.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Assigning frequency channels permanently for each link in a multi-link communication network, or other transmission parameters affecting bandwidth of a communication link, often results in a waste of spectral resources. Several methods are described herein, each of which potentially provides a solution for resolving mutual interference and/or improving link capacity without incurring undue mutual interference.

The methods may be applied separately and/or simultaneously.

The term channel is used herein for describing a range of frequencies in which a signal is transmitted. The range is not necessarily continuous, as depicted with reference to FIGS. 4A-F.

The term transmission channel parameters includes transmission parameters which affect reception quality and interference between wireless links such as, by way of some non-limiting examples: frequency, polarization, transmission power, and coding and modulation type (such as various levels of QAM modulation, e.g. 4, 8, 16, 32, 64, 128, 256 QAM).

Figure 4A:
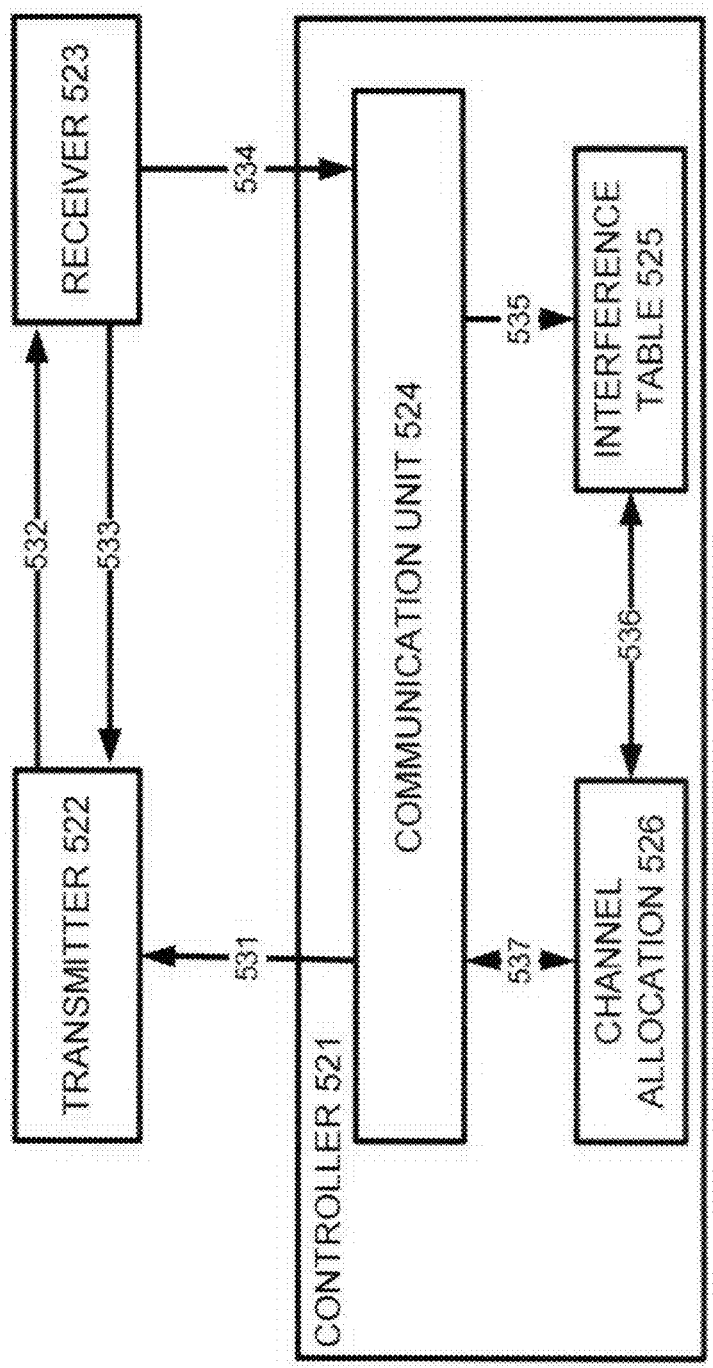
FIG. 4A is a simplified block diagram illustration of components of a channel allocation controller according to an example embodiment of the invention.

Reference is now made to FIG. 4A, which is a simplified block diagram illustration of components of a channel allocation controller 521 according to an example embodiment of the invention.

FIG. 4A depicts an example embodiment which includes a channel allocation controller 521, a transmitter 522 and a receiver 523 according to an example embodiment of the invention.

In the example embodiment of FIG. 4A, the channel allocation controller 521 optionally uses a communication unit 524 to send a message 531 to the transmitter 522, optionally reassigning a channel to a link between the transmitter 522 and the receiver 523. The transmitter 522 optionally sends one or more messages 532 to the receiver 523, and the receiver 523 may optionally send one or more messages 533 to the transmitter 522, setting a time (schedule) to switch channels and/or transmission parameters.

The message 531 optionally includes a new set of transmission parameters.

The message 532 optionally informs the receiver 523 of the new set of transmission parameters, and optionally sets a schedule for switching to the new set of parameters.

The message 533 optionally acknowledges the message 532 from the transmitter 522.

In some embodiments, the receiver 533 may optionally send a message 534 informing the channel allocation controller 521 of a change in channel conditions between the transmitter 522 and the receiver 523.

In some embodiments, the channel allocation controller 521 may use data from the message 534 to update an interference table 525.

In some embodiments, the channel allocation controller 521 may use a channel allocation unit 526 to read 536 data from the interference table 525, which may cause the channel allocation unit 526 to issue a message 537 for allocating a channel or changing a channel allocation.

Figure 4B:
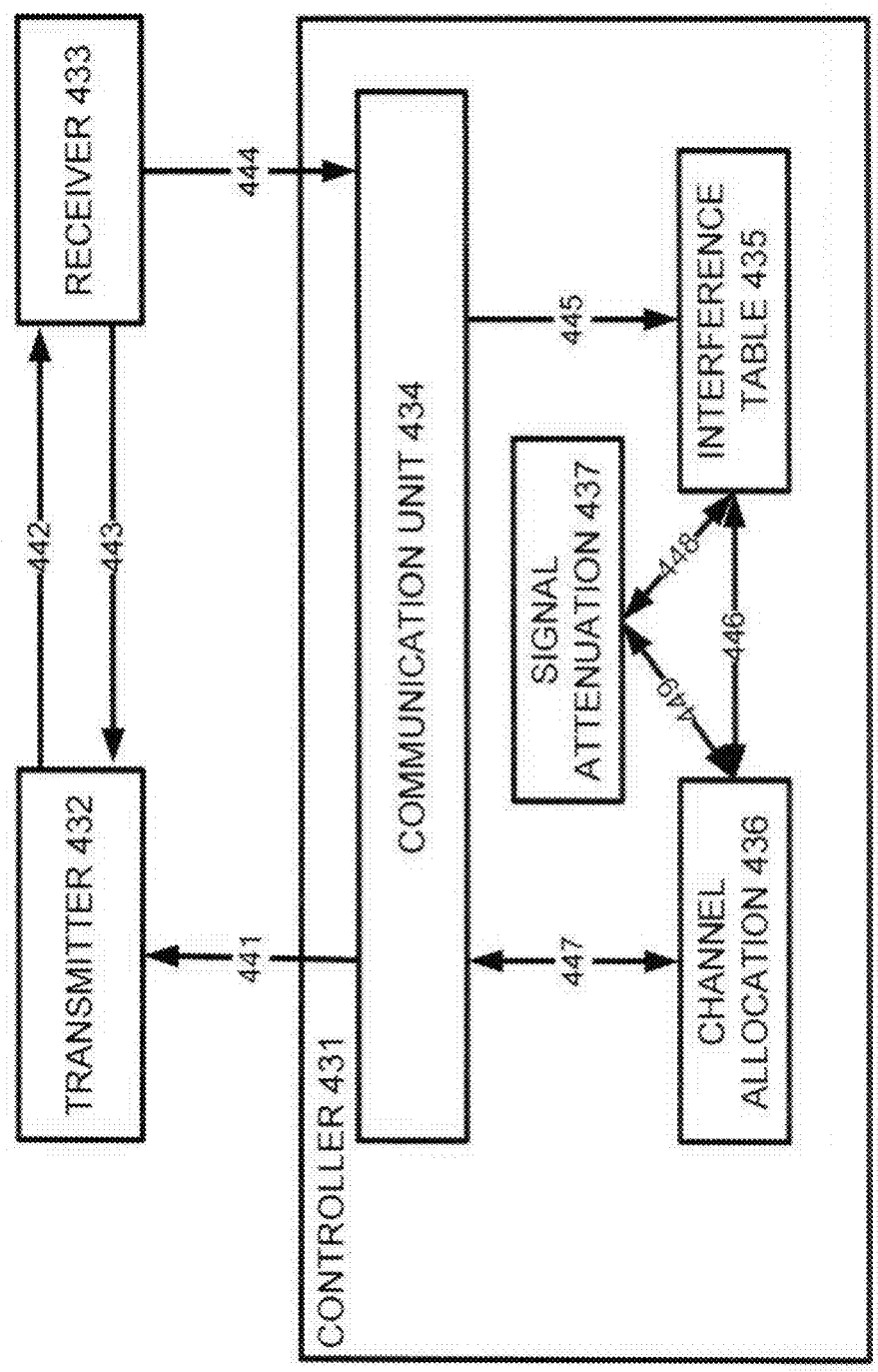
FIG. 4B is a simplified block diagram illustration of components of a channel allocation controller according to another example embodiment of the invention.

Reference is now made to FIG. 4B, which is a simplified block diagram illustration of components of a channel allocation controller according to another example embodiment of the invention.

FIG. 4B depicts an example embodiment which includes a channel allocation controller 431, a transmitter 432 and a receiver 433 according to an example embodiment of the invention.

In the example embodiment of FIG. 4B the channel allocation controller 431 also includes a signal attenuation estimation unit 437, in optional communication 448 with an interference table 435 and/or in optional communication 449 with a channel allocation unit 436.

In the example embodiment of FIG. 4B, the channel allocation controller 431 optionally uses the signal attenuation estimation unit 437 to calculate desired transmission parameters, optionally as described below with reference to FIGS. 4C 4D, 7B, 8A and 8B.

In the example embodiment of FIG. 4B, the channel allocation controller 431 optionally uses a communication unit 434 to send a message 441 to the transmitter 432, optionally reassigning a channel to a link between the transmitter 432 and the receiver 433. The transmitter 432 optionally sends one or more messages 442 to the receiver 433, and the receiver 433 may optionally send one or more messages 443 to the transmitter 432, setting a time (schedule) to switch channels and/or transmission parameters.

The message 441 optionally includes a new set of transmission parameters.

The message 442 optionally informs the receiver 433 of the new set of transmission parameters, and optionally sets a schedule for switching to the new set of parameters.

The message 443 optionally acknowledges the message 442 from the transmitter 432.

In some embodiments, the receiver 433 may optionally send a message 444 informing the channel allocation controller 431 of a change in channel conditions between the transmitter 432 and the receiver 433.

In some embodiments, the channel allocation controller 431 may use data from the message 444 to update an interference table 435.

In some embodiments, the channel allocation controller 431 may use a channel allocation unit 436 to read 446 data from the interference table 435, which may cause the channel allocation unit 436 to issue a message 447 for allocating a channel or changing a channel allocation.

Figure 4C:
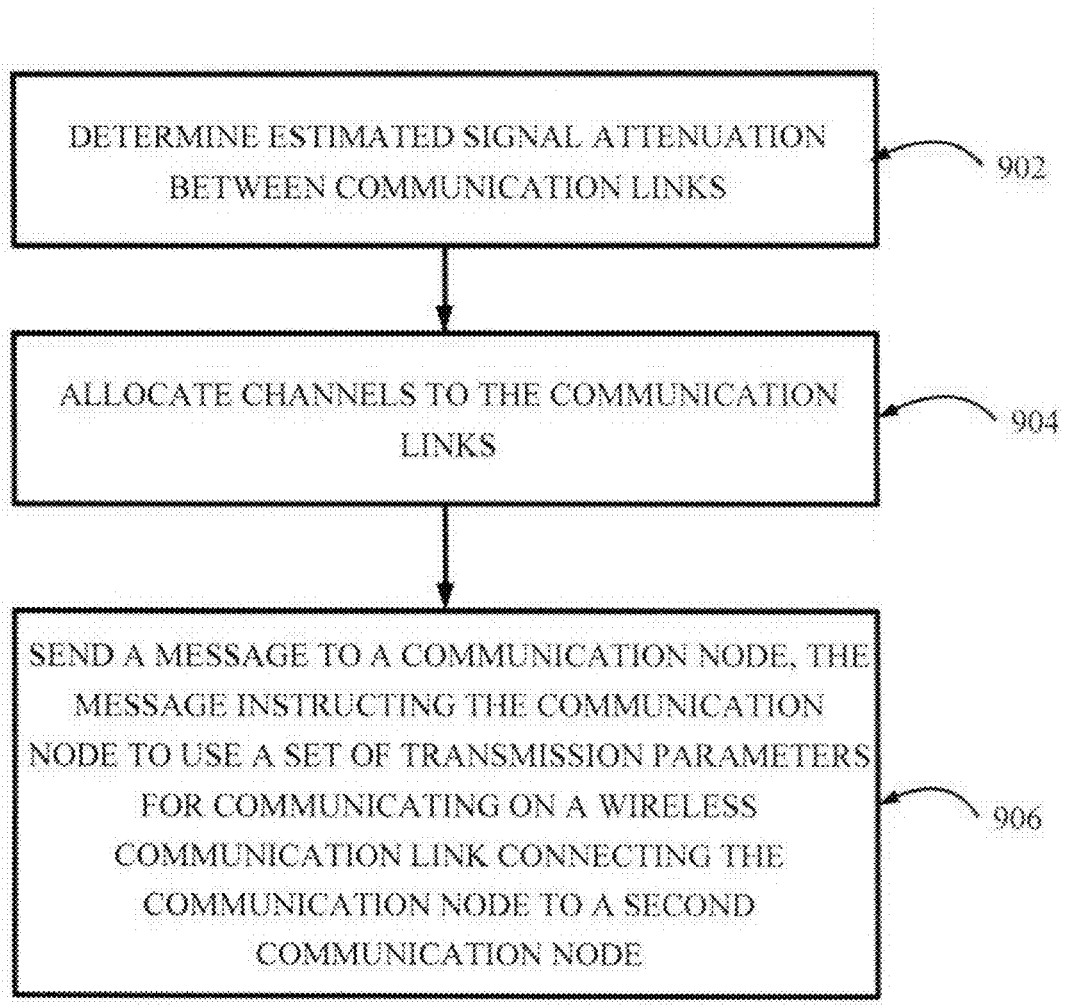
FIG. 4C is a simplified flow chart illustration of a method for automatic channel allocation for a network of communication links between communication nodes according to an example embodiment of the invention.

Reference is now made to FIG. 4C, which is a simplified flow chart illustration of a method for automatic channel allocation for a network of communication links between communication nodes according to an example embodiment of the invention.

The method of FIG. 4C includes:

determining an estimated signal attenuation over a plurality of wireless communication links between communication nodes in a network (902). The determining may optionally be performed by a network controller or by a computer, or the network controller may be a computer;

allocating wireless channels to the communication links (904). The wireless channels are typically determined by a set of transmission parameters, which potentially determine a set of corresponding parameters to be used by a receiver for receiving the transmission;

sending a message to a communication node, the message instructing the communication node to use a set of transmission parameters for communicating on a wireless communication link connecting the communication node to a second communication node (906). The set of transmission parameters determines a channel to be used over the wireless communication link. The channel may be an only channel between the first and the second communication node, or one of several. The transmission parameters are optionally based, at least in part, on the above-mentioned allocation of the wireless channels.

It is noted that the transmission parameters, or channels, assigned as described herein, by way of a non-limiting example in the descriptions of FIGS. 4C and 4D, may be split frequency channels such as described below with reference to FIGS. 4D and 4E.

Figure 4D:
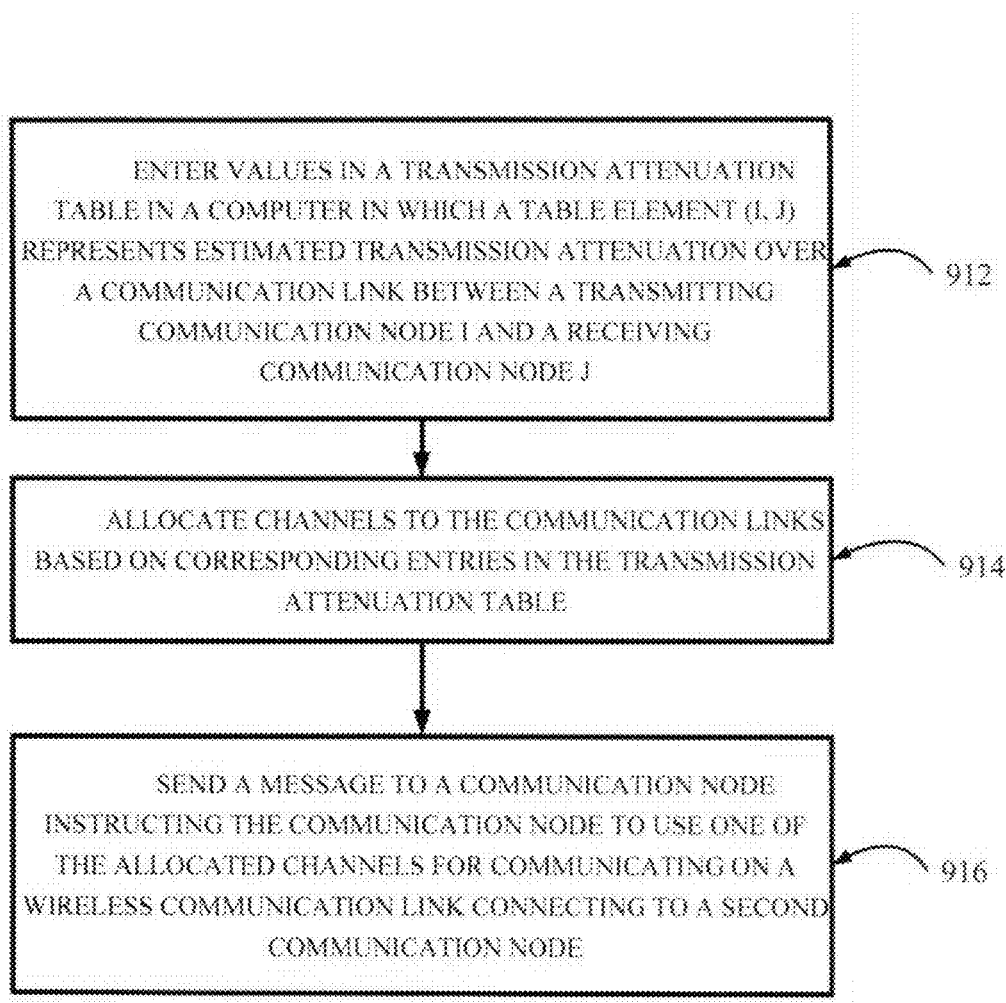
FIG. 4D is a simplified flow chart illustration of a method for automatic channel allocation for two or more communication links between communication nodes according to another example embodiment of the invention.

Reference is now made to FIG. 4D, which is a simplified flow chart illustration of a method for automatic channel allocation for two or more communication links between communication nodes according to another example embodiment of the invention.

The method of FIG. 4D includes:

entering values in a transmission attenuation table in a computer in which a table element (i, j) represents estimated transmission attenuation over a communication link between a transmitting communication node i and a receiving communication node j (912). The values in the table may be based on data sheets for antennas participating in the communication link and an angle by which the antennas transmit and receive relative to each other's direction, and/or data received in reports about transmission attenuation sent from communication nodes in the network;

allocating channels to the communication links based, at least in part, on corresponding entries in the transmission attenuation table (914). Allocating is described in more detail, by way of a non-limiting example, in a section titled "An example scenario of an embodiment of dynamic channel allocation" below;

sending a message to a communication node, the message instructing the communication node to use one of the allocated channels for communicating on a wireless communication link connecting the communication node to a second communication node (916).

Figure 4E:
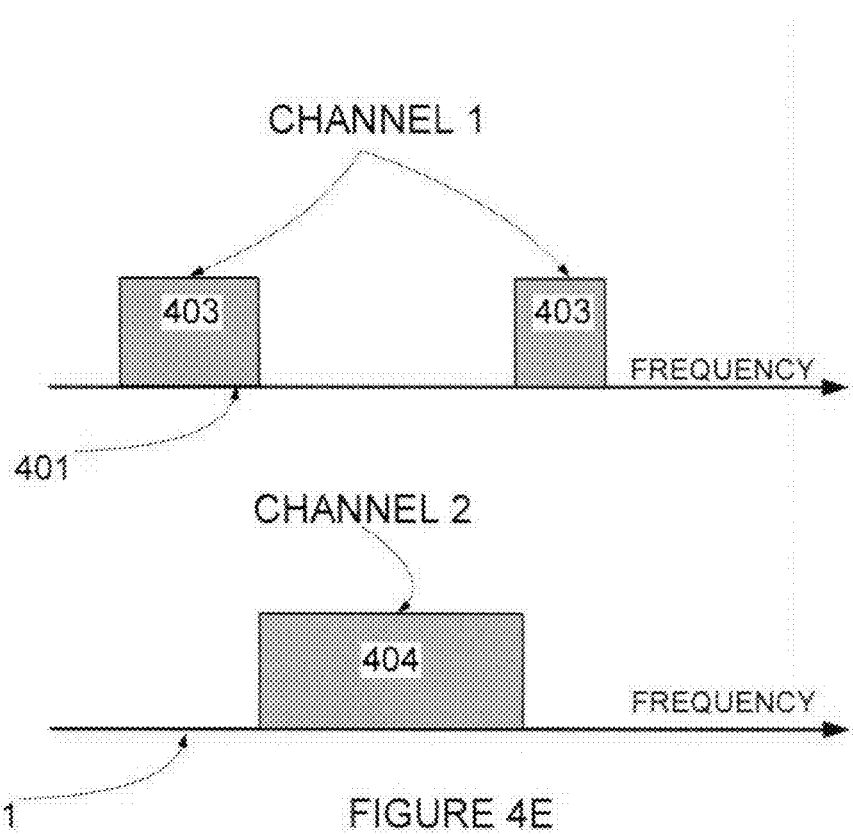
FIG. 4E depicts a simplified illustration of two non-overlapping channels according to an example embodiment of the invention.

Reference is now made to FIG. 4E, which depicts a simplified illustration of two non-overlapping channels according to an example embodiment of the invention.

FIG. 4E depicts an X-axis 401 representing frequency.

The example in FIG. 4E depicts two non-overlapping channels, channel 1 403 and channel 2 404. However, it is noted that channel 1 403 and channel 2 404 are adjacent to each other in frequency. It is noted that in general channel 1 403 and channel 2 404 do not have to be adjacent.

The example in FIG. 4E depicts a non-limiting example where channel 1 403 is a communication channel which has spectrum resources split between two frequency ranges, in order to demonstrate that a channel may have non-contiguous spectrum resources.

The terms non-overlapping and adjacent or contiguous are extended herein to refer to the time domain as well as the frequency domain. Two channels may use the same frequency range at different times.

Figure 4F:
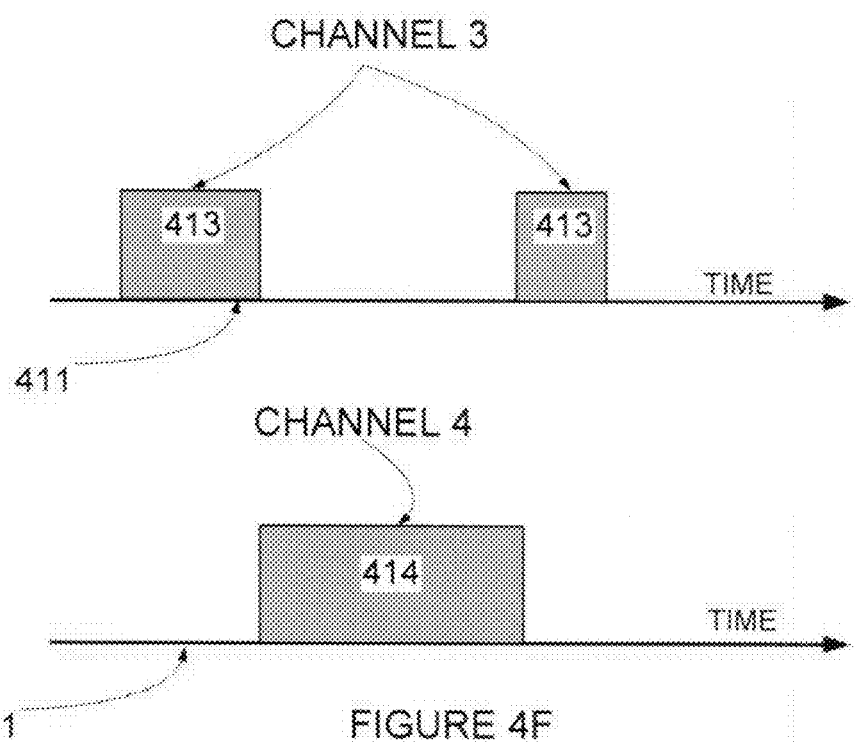
FIG. 4F depicts a simplified illustration of two non-overlapping channels according to an example embodiment of the invention.

Reference is now made to FIG. 4F, which depicts a simplified illustration of two non-overlapping channels according to an example embodiment of the invention.

FIG. 4F depicts an X-axis 411 representing time.

The example in FIG. 4F depicts two non-overlapping channels, channel 3 413 and channel 4 414. It is noted that channel 3 413 and channel 4 444 are time-wise adjacent to each other.

In the example of FIG. 4F the two channels are non-overlapping despite possibly having the same frequencies. If a transmission on a second channel starts right after a transmission on a first channel stops, the channels are non-overlapping and adjacent (in time).

In the following paragraphs the terms overlapping, or non-overlapping will be used in a wider scope, in which overlapping and non-overlapping may be, for example, in time or in frequency.

It is noted that in embodiments of the invention, channels may be wholly overlapping, partially overlapping, and non-overlapping, in time and/or frequency, as may be understood by a person skilled in the art upon reading the description herein.

Centralized Controller

In example embodiments a centralized controller is programmed to coordinate operation of a network with multiple point-to-point communication links. In some embodiments, the centralized controller assigns channels and/or transmission parameters to each one of the communication links.

In some embodiments the centralized controller has data regarding at least some of the communication links, such as, by way of a non-limiting example, one or more of the following parameters:

a transmitted power level;

a received power level;

a received signal to noise and interference (SINR) level;

a communication rate [bits/sec];

a constellation size; a symbol rate [symbols/sec];

a coding rate;

a geographic location of a transmitter of the communication link;

a geographic location of a receiver of the communication link;

a beam direction of the transmitter;

a beam direction of the receiver;

a beam width [degrees] of the transmitter;

a beam width [degrees] of the receiver;

a fixed attenuation factor related to the communication link, such as, by way of a non-limiting example, attenuation caused by obstructions along the link.

In some embodiments, at least some of the above parameters are reported from communication units (transmitters and/or receivers respectively) upon change in their values, and/or periodically, and/or upon setup, as may be understood by a person skilled in the art.

Identifying a Source of Interference

In some embodiments, a transmitter in the network transmits a unique word periodically. The word is optionally made sufficiently long as to make it detectable even at a low received power level, such as is received as interference rather than as a direct transmission. The power level is optionally specified according to expected interference by the transmitter at neighboring receivers.

Optionally, during an interference event an interfered receiver may report to the controller the identity of the transmitter of the interfering signal, optionally as indicated by its unique word.

In some embodiments, the controller estimates the identity of the interfering transmitter from geographic and beam information.

In some embodiments a task of the controller is to assign one or more transmission parameters such as listed above, for example channels and/or transmit power levels and/or communication rates to transmitters and/or receivers in the communication link, for example in order to optimize the network with respect to some criterion such as, by way of a non-limiting example:

Total communication rate

Maximizing a minimal link communication rate for at least one specific link

Total power consumption

Best fit for the flow of traffic

Minimizing the maximal mutual interference.

By way of a non-limiting example, in some embodiments the controller may optionally minimize maximal mutual interference by first allocating different frequencies to links which have a potential to interfere with each other the most.

In some scenarios optimizing one criterion may also lead to optimizing another.

Communication Link Modem Features

In some embodiments, a transmitter and a receiver, which may be termed a modem when operated together, are used in transmitting data over a communication link and support errorless channel switching. Channel switching may include carrier frequency switching and/or bandwidth switching and/or transmit-receive schedule switching. In some embodiments, the transmitter and the receiver are scheduled to synchronize channel switching at the same time, so as to potentially make the switch errorless.

It is typically a receiver which detects a change in communication conditions, such as a change in the interference level, a change in the received signal power, and so on.

In some embodiments, the receiver optionally notifies the centralized controller about a change in the quality of the received signal.

In some embodiments, the receiver optionally notifies the transmitter about a change in the quality of the received signal, as may be done in systems without centralized control, and in some embodiments it is the transmitter which optionally notifies the centralized controller about a change in the quality of the received signal.

In some embodiments the notification is performed before errors occur, optionally based on a gradually increasing error rate before error correction and/or a gradually decreasing reception power level, optionally allowing the whole system time to respond.

In some embodiments a receiver optionally detects a unique word received from an interfering signal, and optionally sends the unique word to the centralized controller for identification of the interferer.

In some embodiments a receiver optionally detects a unique word received from an interfering signal, optionally identifies the transmitter of the unique word, and optionally informs the centralized controller about the identity of the interferer and its interference level.

An Example Embodiment of Dynamic Transmission Parameter Allocation

In an example embodiment, if a centralized controller decides to reassign a channel to a link, a controller optionally informs a transmitting side of the link of a schedule of a switch, including one or more of, by way of a non-limiting example: a new bandwidth; a new frequency channel; a new modulation format; and a new power level.

In an example embodiment, it is the transmitting side of the link which optionally informs a receiving side of the link of the schedule of the switch, including one or more of, by way of a non-limiting example: a new bandwidth; a new frequency channel; a new modulation format; and a new power level.

In an example embodiment, it is the controller which optionally informs a receiving side of the link of the schedule of the switch, including one or more of, by way of a non-limiting example: a new bandwidth; a new frequency channel; a new modulation format; and a new power level.

The receiver optionally acknowledges the instructions and/or information it has received. An example of the above scenario is described below with reference to FIG. 5.

Figure 5:
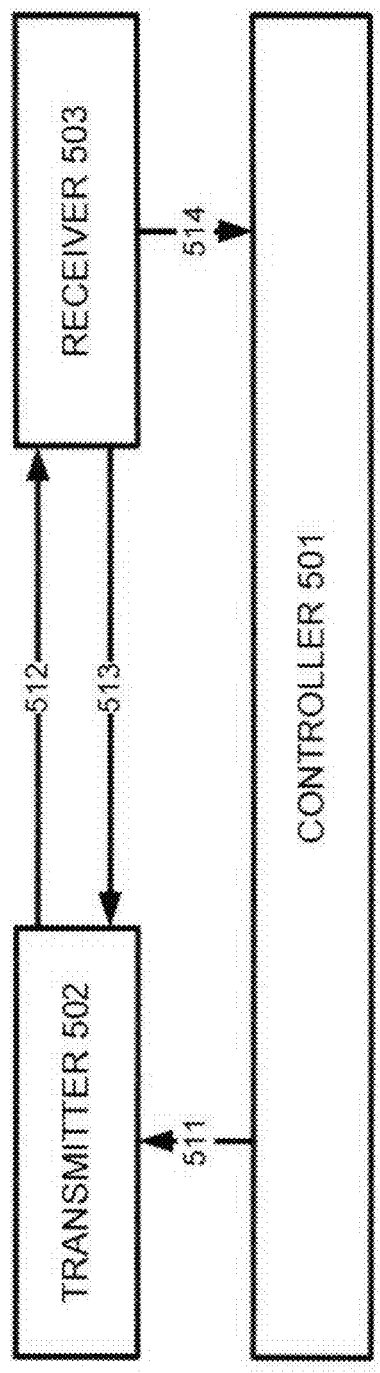
FIG. 5 is a simplified block diagram illustration of data flow between a centralized controller, a transmitter and a receiver according to an example embodiment of the invention.

Reference is now made to FIG. 5, which is a simplified block diagram illustration of data flow between a centralized controller 501, a transmitter 502 and a receiver 503 according to an example embodiment of the invention.

FIG. 5 depicts an example embodiment in which the controller 501 sends a message 511 to the transmitter 502, optionally reassigning a channel to a link between the transmitter 502 and the receiver 503. The transmitter 502 optionally sends one or more messages 512 to the receiver 503, and the receiver 503 may optionally send one or more messages 513 to the transmitter 502, setting a time (schedule) to switch channels and/or transmission parameters.

The message 511 optionally includes a new set of transmission parameters.

The message 512 optionally informs the receiver 503 of the new set of transmission parameters, and optionally sets a schedule for switching to the new set of parameters.

The message 513 optionally acknowledges the message 512 from the transmitter 502. The receiver 503 may optionally send a message 514 informing the controller 501 of a change in channel conditions.

What Initiates Dynamic Transmission-Parameter Allocation?

In some embodiments, the centralized controller initiates dynamic transmission-parameter allocation. Such initiation may optionally be caused following the centralized controller identifying a need for dynamic transmission-parameter allocation.

For example, in some embodiments, such initiation may follow when a receiver in a network of point-to-point communication links reports data to the controller which reflects a need for attempting such dynamic allocation.

For example, in some embodiments, such initiation may follow when a transmitter in a network of point-to-point communication links, which optionally receives data about reception quality from a corresponding receiver, reports data to the controller which reflects a need for attempting such dynamic allocation.

For example, in some embodiments, such initiation may follow when the controller calculates that an improved reception network may be set up by dynamically changing transmission-parameter (channel) allocation in a network of point-to-point communication links. An example method for calculating is described further below, with reference to Table 1.

It is noted that in some embodiments, communication of communication nodes with the controller is a part of the traffic which flows through the network.

Who Initiates Dynamic Transmission-Parameter Allocation?

For example, in some embodiments, such a new transmission-parameter allocation may be caused by the controller 501. By way of a non-limiting example, by calculating, as described above, that an improved reception network may be set up by dynamically changing transmission-parameters.

For example, in some embodiments, such a new transmission-parameter allocation may be caused by the controller 501 receiving data from a receiver 503 in a node in the network of point-to-point communication links that reception is suffering from a high level of noise and/or errors.

For example, in some embodiments, such a new transmission-parameter allocation may be caused by the controller 501 receiving data from a transmitter 502 in a node in the network of point-to-point communication links that reception in a corresponding receiver 503 is suffering from a high level of noise and/or errors.

In some embodiments the transmitter 502 may decide not to switch to a new state (new set of transmission parameters, new channel) if it did not receive an acknowledge message. In such a case the transmitter 502 may optionally resend the message 512, optionally with a new schedule.

The transmitter should include functionality for modifying the parameters mentioned above, as described in FIG. 6 below.

Figure 6:
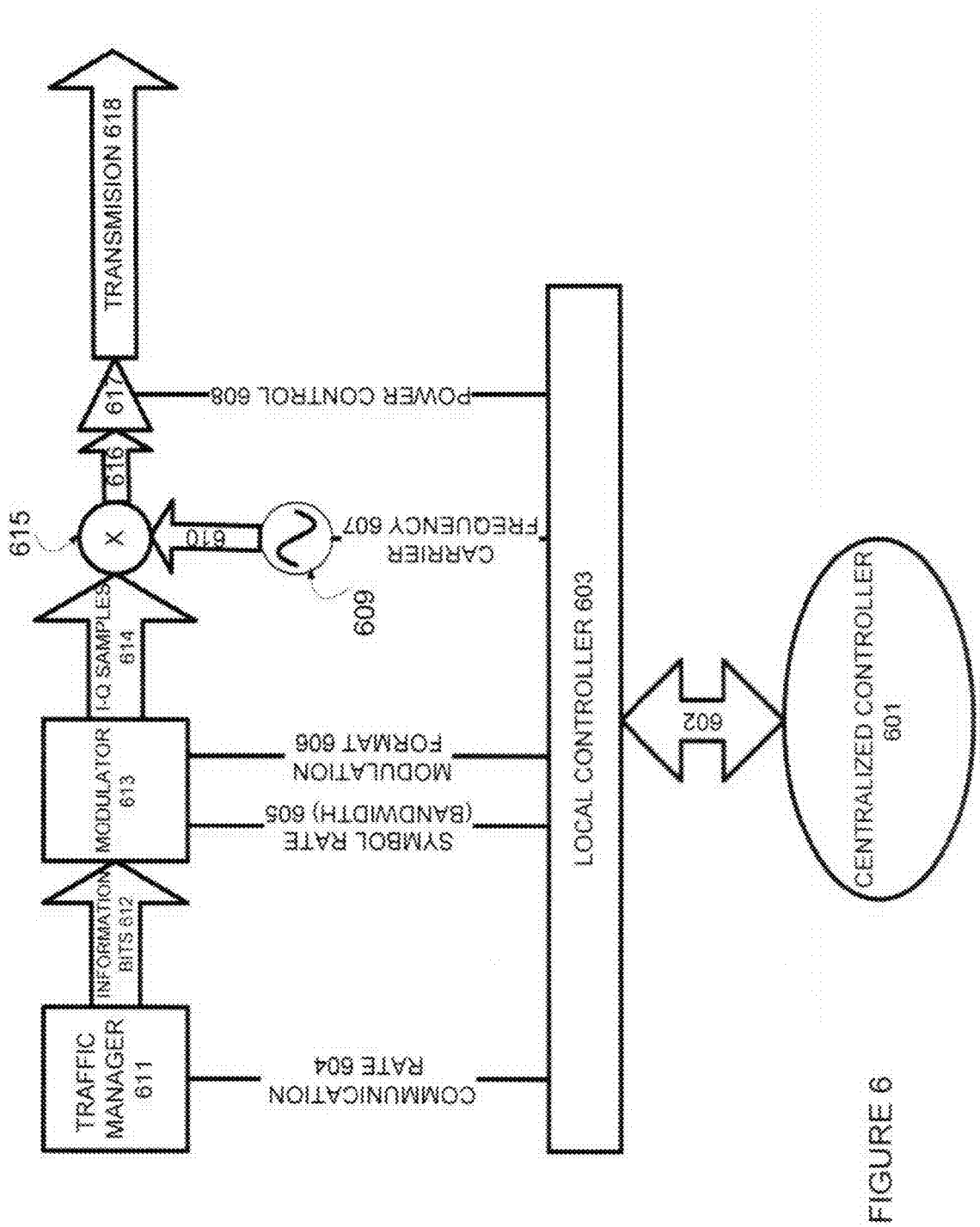
FIG. 6 is a simplified block diagram illustration of some components and data flows participating in an example embodiment of the invention.

Reference is now made to FIG. 6, which is a simplified block diagram illustration of some components and data flows participating in an example embodiment of the invention.

FIG. 6 depicts a centralized controller 601, in communication with a local controller 603. The local controller 603 is operatively connected to a traffic manager 611, a modulator 613, a frequency source 609 and a power amplifier 617.

In the example embodiment of FIG. 6, the centralized controller 601 optionally sends instructions 602 and/or received data 602 from a component termed herein a local controller, which can set various transmission parameters in a transmitter.

The local controller 603 optionally performs one or more of:
sends communication rate settings 604 to the traffic manager 611;
sends symbol rate settings 605, which potentially determine bandwidth, to the modulator 613;
sends modulation format settings 606, which potentially determine bandwidth, to the modulator 613;
sends carrier frequency settings 607 to the carrier frequency source 609; and/or
sends power control settings 608 to the power amplifier 617.

The traffic manager 611 optionally produces information bits 612 for preparing for transmission, optionally according to the communication rate settings 604 sent by the local controller 603.

The modulator 613 optionally produces I-Q samples 614 for a multiplier 615 to modulate onto a carrier frequency 610, produced by the carrier frequency source 609, optionally according to the carrier frequency settings 607 sent by the local controller 603.

The multiplier 615 optionally produces a modulated carrier frequency 616 for input to the power amplifier 617, optionally amplifying to a power level set according to the power control settings 608 sent by the local controller 603.

An Example Scenario of an Embodiment of Dynamic Channel Allocation

An example scenario of an embodiment of dynamic channel allocation is now described. The example scenario is set, by way of a non-limiting example, in a certain geographic region. In the example scenario it is possible to let a controller assign channels adaptively, for example so that communication rates or power consumption are optimized. It is assumed that there are more links in the network than available channels.

In a first example assigning channels to links without compromising their bandwidth or transmission power is described. An example goal of the assignment is to minimize maximal mutual interference.

In the example embodiment an assignment method starts with sorting communication links according to mutual interference level. Channels which, according to geographic and geometrical data or according to measurements, cause the highest mutual interference optionally appear at a beginning of the list. Channel assignment optionally starts with these links.

Figure 7A:
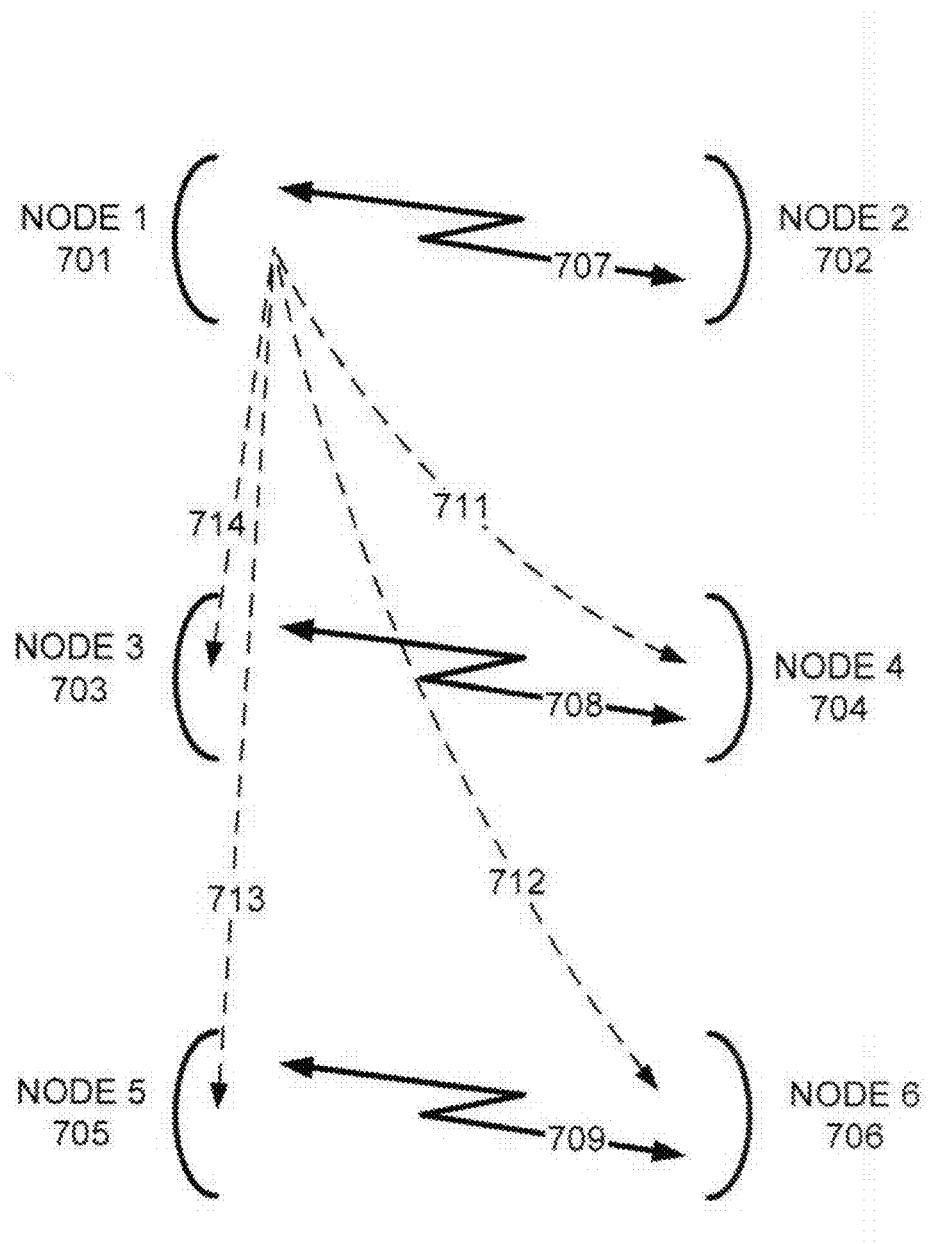
FIG. 7A is a simplified illustration of an example scenario of six nodes in a network of point-to-point communication links according to an example embodiment of the invention.

Reference is now made to FIG. 7A, which is a simplified illustration of an example scenario of six nodes 701 702 703 704 705 706 in a network of point-to-point communication links according to an example embodiment of the invention.

Node 1 701 is set to communicate with node 2 702; Node 3 703 is set to communicate with node 4 704. Node 5 705 is set to communicate with node 6 706. FIG. 7A also depicts mutual interference routes 711 712 713 174 which involves node 1 701 and nodes 3, 4, 5, and 6 which are not intended to communicate with node 1 701.

The example network can be described in a matrix fashion in Table 1 below, in which element (i, j) represents attenuation, in units of dB, between a transmitting node i and a receiving node j.

TABLE 1

| 0 | <u>50</u> | 120 | 105 | 85 | 100 |
| <u>50</u> | 0 | 84 | 90 | 110 | 88 |
| 120 | 84 | 0 | <u>40</u> | 85 | 95 |
| 105 | 90 | <u>40</u> | 0 | 90 | 80 |
| 85 | 110 | 85 | 90 | 0 | <u>35</u> |
| 100 | 88 | 95 | 80 | <u>35</u> | 0 |

The underlined numbers denote attenuation between nodes which are intended to communicate with each other, and represent the communication links in the communication network. The numbers along the top-left to bottom-right diagonal of the matrix denote attenuation between a node and itself, which is assumed to be 0 in the present example. Other numbers in the matrix denote attenuation between nodes i and j.

The non-underlined and non-diagonal numbers in the matrix, denote attenuation between nodes which are not intended to communicate with each other, and represent interference between the communication links in the communication network.

In some embodiments, an interference table similar to Table 1 above denotes interference between nodes which wish to communicate with each other. The numbers along the top-left to bottom-right diagonal of the matrix then denote interference between a node and itself, which is assumed to be 0 in the present example. Other numbers in the matrix denote interference between nodes i and j.

In some embodiments an interference table uses negative values—where the larger the absolute value, the lower the interference.

The matrix may optionally also be named, in the specification and claims, a table.

The matrix of Table 1 demonstrates that when node 1 transmits a signal to node 2 the signal is attenuated by 50 dB. However, when node 3 transmits a signal the signal is received at node 2 with an attenuation of 84 dB, resulting in a difference in received signal power between an intended communication link and an unintended communication link of −34 dB. This is an example of a worst case of interference according to the example matrix, therefore, according to the non-limiting example embodiment, the channels of these two links (node 1 to node 2 and node 3 to node 4) should be at a beginning of a list for channel assignment. It is desirable that the above-mentioned links be assigned non-overlapping channels, which would potentially minimize interference. In some embodiments, the channels are at least scheduled for less interfering channels.

In the example embodiment, the following calculation is also optionally carried out.

The link attenuation matrix by is denoted by A. The function t(r) denotes a row of a transmitter communicating with a receiver in column r.

For each receiver, the largest interference is calculated, expressed in terms of signal to interference ratio (SIR).

$$SIR[r] = \min_{k \neq t(r)} \{A[k, r] - A[t(r), r]\} \qquad \text{Equation 1}$$

The receivers are optionally sorted according to the SIR values, producing a sorted list. The receiver with a minimal SIR is preferably the first in the list.

Channels for the receiver in the beginning of the list and the transmitter which caused the highest interference to this receiver are optionally assigned first. The first channels are preferably non-overlapping.

Optionally, channels for the following pair of links are then assigned.

If a transmitter which causes the worst interference has already been assigned a channel, it is preferably not reassigned. A non-overlapping channel is preferably selected for the receiver.

It is noted that when a new communication node is added to an existing network described in an interference table, a row and/or a column representing the new communication node may optionally be added to the interference table, and also optionally data which details attenuation or the relative interference between the new transmitting node and existing receiving nodes and/or attenuation or relative interference between existing transmitting nodes and the new receiving node.

It is noted that when an existing communication node is removed from an existing network described in an interference table, a row and/or a column representing the removed communication node may optionally be removed from the interference table.

Figure 7B:
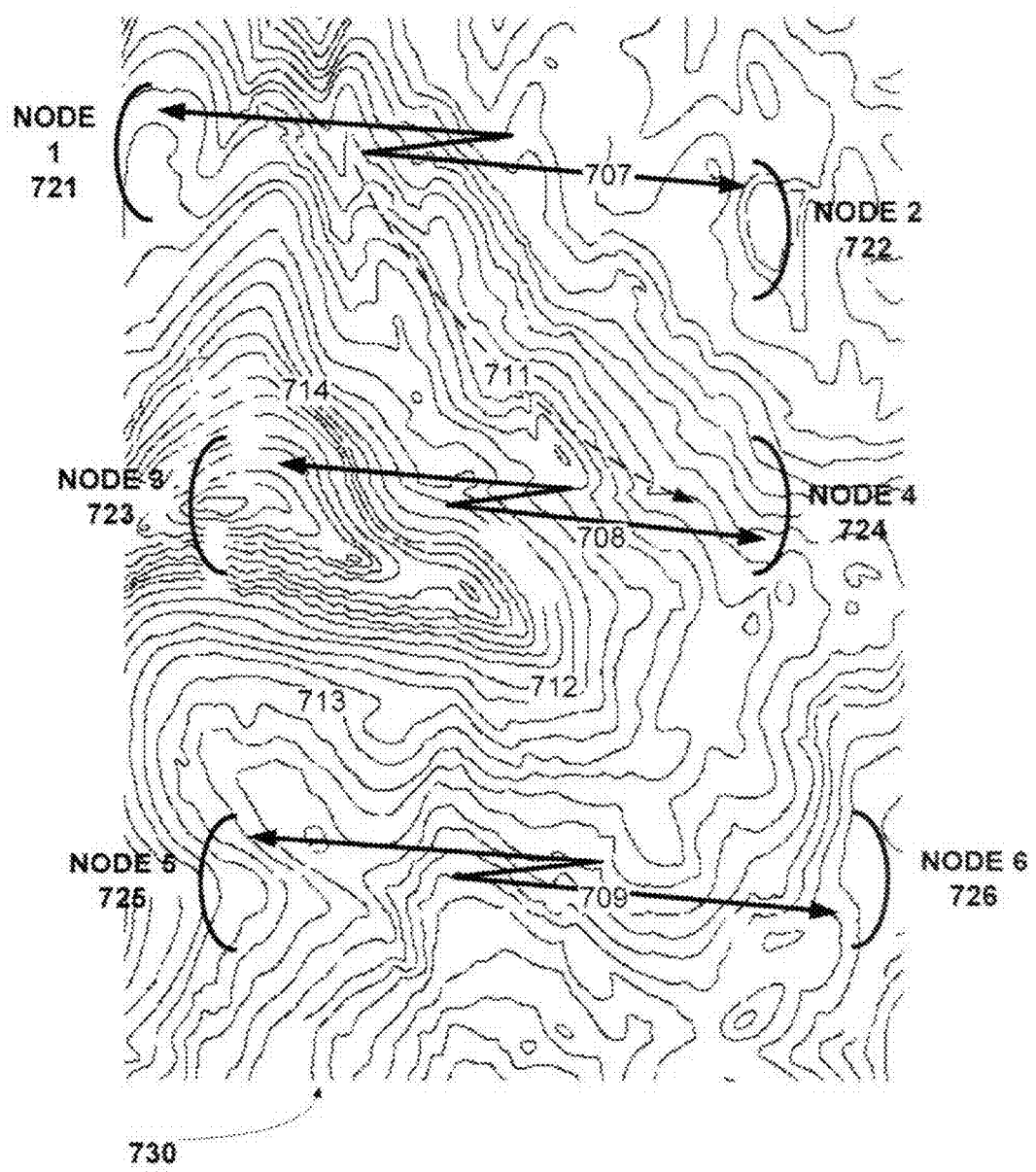
FIG. 7B is a simplified illustration of an example scenario of six nodes in a network of point-to-point communication links according to an example embodiment of the invention.

Reference is now made to FIG. 7B, which is a simplified illustration of an example scenario of six nodes 721 722 723 724 725 726 in a network of point-to-point communication links according to an example embodiment of the invention.

FIG. 7B depicts the six nodes 721 722 723 724 725 726 located on a map 730 of the areas in which the nodes will be placed, at the location at which the nodes 721 722 723 724 725 726 will be placed.

In some embodiments the map may be a digital map which includes two dimension or three dimensions of spatial location.

In some embodiments a list or table of locations of the nodes 721 722 723 724 725 726 is kept, including values in two or three dimensions describing the locations. In some embodiments a main direction of an antenna dish at each one of the nodes 721 722 723 724 725 726 is also kept in the list/table. In some embodiments the main direction is kept as an azimuth (two dimensional) and in some embodiments the main direction is kept including elevation (three dimensional).

The above-mentioned list/table enables calculating an azimuthal angle between a main direction of a dish of one of the nodes 721 722 723 724 725 726 and any second one of the nodes 721 722 723 724 725 726; an elevation angle between a main direction of a dish of one of the nodes 721 722 723 724 725 726 and any second one of the nodes 721 722 723 724 725 726; and a combined angle which includes a difference in azimuth and elevation between a main direction of a dish of one of the nodes 721 722 723 724 725 726 and any second one of the nodes 721 722 723 724 725 726.

In some embodiments the above-mentioned angles is optionally used to determine mutual power attenuation values, or mutual interference values, between any two of the nodes 721 722 723 724 725 726.

In some embodiments, the above mutual power attenuation values, or mutual interference values are optionally used to determine an attenuation matrix, as described above.

In some embodiments the above-mentioned attenuation matrix determined by using a map is optionally used to determine an initial attenuation matrix, and optionally used for determining and initial distribution of channels.

In some embodiments a frequency band allocated for the communication links, including channels within the frequency band, is known before the attenuation is determined, since attenuation potentially depends on frequency.

In some embodiments the initial attenuation matrix is subsequently updated by entering actual attenuation values as measured during actual use.

Figure 8A:
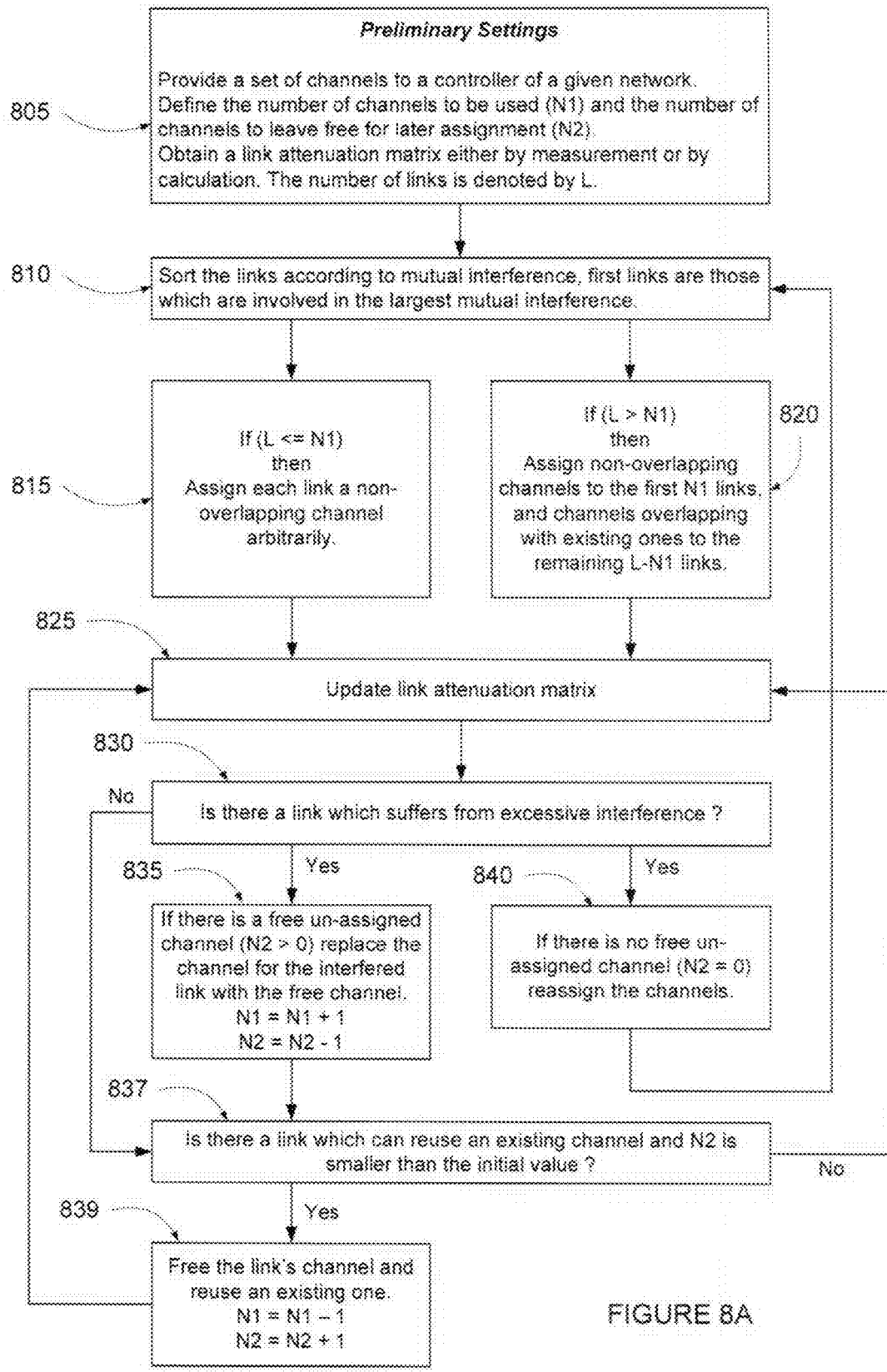
FIG. 8A is a simplified flow chart illustration of a method for allocating channels according to an example embodiment of the invention.

Reference is now made to FIG. 8A, which is a simplified flow chart illustration of a method for allocating channels according to an example embodiment of the invention.

A controller is optionally provided with initial data for allocating channels (805). The initial data optionally determined preliminary settings for the controller.

The initial data includes one or more of:
a set of channels;
the number of channels to be used (N1);
the number of channels to leave free for later assignment (N2); and
a link attenuation matrix (either by measurement or by calculation). The number of links is optionally denoted by L.

The links are optionally sorted according to their mutual interference (810), optionally in order from largest mutual interference to smallest mutual interference.

If (L<=N1) then each link is assigned a non-overlapping channel (815), optionally arbitrarily, possibly using other considerations.

If (L>N1) then non-overlapping channels are assigned to the first N1 links, and channels overlapping with assigned channels are assigned to the remaining L−N1 links (820).

The link attenuation matrix is updated with the channel assignments (825).

In some embodiments, mutual attenuation is initially obtained by known theoretical methods. In an example embodiment, in line-of-sight scenarios, which are common for cellular backhaul applications, calculations are optionally based on antenna radiation patterns, frequency band and distance.

In some embodiments the initial determination of mutual attenuation does not take into account temporary effects such as rain. Rain typically has an effect on attenuation, especially at high frequencies, such as, for example, 40 GHz. In such cases interference may optionally be measured by the system and fed into the attenuation calculations.

In some embodiments, each transmitter optionally sends, periodically, a signature signal identifying the transmitter. A receiver which is interfered with is then optionally able to identify the interfering transmitter by correlating a received signal with signature signals of possible interfering transmitters. A high correlation value may identify an interfering transmitter.

In some embodiments, the correlation value would indicate the amount of interference. This information may optionally be passed on to the controller which may take actions to reduce interference if required.

Optionally, the controller checks if there is a link which suffers from excessive interference (830). If there is no such link, then the links have channels which are well-assigned, and there is no need to change the assignment.

If there is such a link then:

If there is a free un-assigned channel (N2>0) then the channel for the link which suffers from excessive interference is replaced with a free channel; and the following variables are assigned values as follows: N1=N1+1; N2=N2−1 (835).

The controller then checks whether there is a link which can reuse an existing channel, and whether N2 is smaller than its initial value (837).

It is noted that in some embodiments it is desirable to maintain a bank of free channels for future allocation. In some embodiments, an initial value of N2 free channels is optionally maintained, if possible.

In such embodiments, if the controller does not free channels when possible, the controller might have to free channels when excessive interference is detected.

If there is no such link, then update the link attenuation matrix according to the replacement with a free channel and return to sorting the links according to the mutual interference of the reassigned channels. If there is such a link, free the link's channel, re-use the existing channel, and assign the following variables values as follows: N1=N1−1; N2=N2+1 (839).

If there is no free un-assigned channel (if N2=0) then reassign the channels (840), update the attenuation matrix, and return to sorting the links according to the mutual interference of the reassigned channels.

In some embodiments, reassigning channels is achieved by performing step 810. Upon reaching step 820 using existing channels as much as possible.

In some embodiments, reassigning channels is achieved by assigning other parameters such as transmit power, (either increasing transmission power of a desired signal, or decreasing transmission power of an interfering signal).

In some embodiments, reassigning channels is achieved by reducing a communication rate by modifying constellation, code, or bandwidth. Such options are discussed in more detail below.

In some embodiments, freeing a channel is optional. If a channel is freed, that is—returned to a bank of free channels, the link which used it is optionally assigned a different channel which is being currently used in a different link.

In some embodiments, a link is optionally assigned to reuse an existing channel only if mutual interference between links using the existing channel is sufficiently low. This depends on predetermined rules which define a maximal permissible interference level per constellation and/or per communication rate.

Figure 8B:
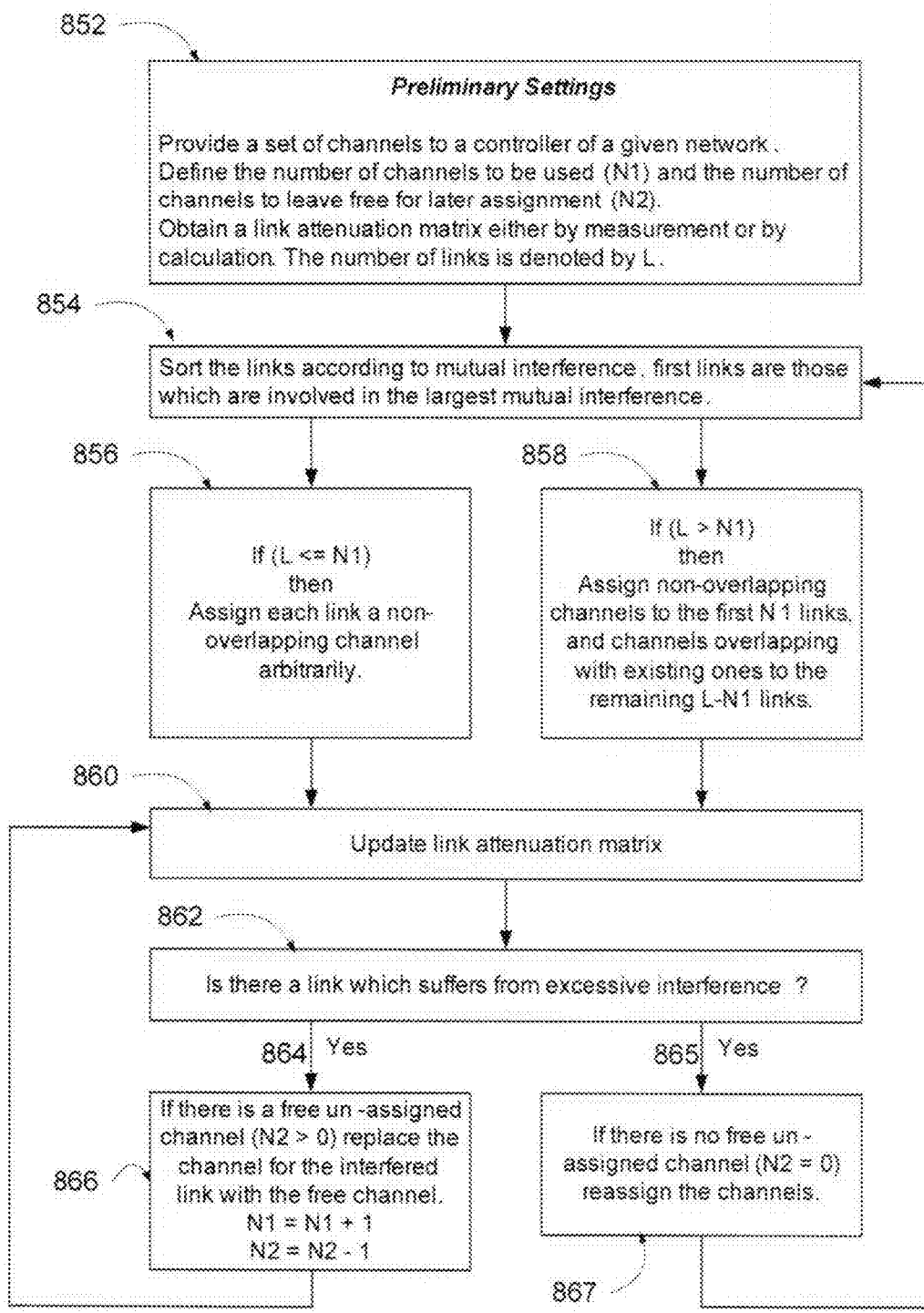
FIG. 8B is a simplified flow chart illustration of a method for allocating channels according to another example embodiment of the invention.

Reference is now made to FIG. 8B, which is a simplified flow chart illustration of a method for allocating channels according to another example embodiment of the invention.

FIG. 8B depicts a simpler flow chart than the flow chart of FIG. 8A.

A controller is optionally provided with initial data for allocating channels (852). The initial data optionally determined preliminary settings for the controller. The initial data includes one or more of:

a set of channels;

the number of channels to be used (N1);

the number of channels to leave free for later assignment (N2); and a link attenuation matrix (either by measurement or by calculation). The number of links is optionally denoted by L.

The links may optionally be sorted according to their mutual interference (854), optionally in order from largest mutual interference to smallest mutual interference.

If (L<=N1) then each link is assigned a non-overlapping channel (856), optionally arbitrarily, possibly using other considerations.

If (L>N1) then non-overlapping channels are assigned to the first N1 links, and channels overlapping with assigned channels are assigned to the remaining L−N1 links (858).

The link attenuation matrix is optionally updated with the channel assignments (860).

Optionally, the controller checks if there is a link which suffers from excessive interference (862). If there is no such link, then the links have channels which are well-assigned, and there is no need to change the assignment.

If there is such a link (864) (865) then:

If there is a free un-assigned channel (N2>0) (864) then the channel for the link which suffers from excessive interference is replaced with a free channel; and the following variables are assigned values as follows: N1=N1+1; N2=N2−1 (866).

If there is no free un-assigned channel (if N2=0) (865) then reassign the channels (867), update the attenuation matrix, and return to sorting the links according to the mutual interference of the reassigned channels.

Channel Reuse

In some embodiments, when a link is assigned to reuse a channel, that is, the link is assigned a channel already in use somewhere in the network, and the channel is optionally preferably selected such that mutual interference is minimized. For example, looking at the attenuation matrix of the example network in Table 1, suppose that channels for nodes 1, 2, 3 and 4 have been allocated. Nodes 5 and 6 are selected for reusing of existing channels. The matrix indicates that it is preferable to reuse the channel of node 2 for transmission in node 5 and the channel of node 1 for transmission in node 6. Attenuation between nodes 2 and 5 is 110 dB, and between nodes 1 and 6 is 100 dB. Selecting any other channel for reuse would cause a larger mutual interference.

In some embodiments, when two links interfere with each other and a channel is selected for reuse, the channel may optionally be reused in either one of the two links. Optionally, mutual interference is evaluated for the two options, and optionally the option which results in a smaller interference is selected.

Transmission Power

The above-mentioned example method assumes all nodes transmit using the same power level. Under such an assumption, in some embodiments, the attenuation matrix is used as-is, with no additional corrections.

In some embodiments, especially when different nodes use different transmission power, the differences in transmission power are optionally subtracted from a corresponding row in the attenuation matrix. For example, if all nodes transmit a power level of 0 dBm, and node 1 transmits a power level of 10 dBm, then 10 dB are optionally subtracted from matrix elements of the first row (corresponding to node 1).

Received Power

The above-mentioned example method assumes all nodes require the same power level at the receiver. When different links use different modulations the receivers present a different sensitivity to interference. In order to take into account the required RSL (Received Signal Level), the RSL should be subtracted from corresponding columns in the attenuation matrix. If, for example all receivers require an RSL of 0 dBm, but the receiver of node 1 requires an RSL of 10 dBm (for example, because node 1 receives from a link using a higher transmission constellation), then 10 dB are optionally subtracted from the first column elements.

Bandwidth

The above-mentioned example method assumes all links use the same bandwidth and available channels may optionally be assigned freely to each of the links. If such is not the case then each link should have channels assigned to it from a relevant bank of channels, the channels being sufficient to provide the desired bandwidth.

Channel Splitting

An example scenario is now described: Two communication links may be transmitting using the same channel. Mutual interference between the two communication links is assumed to be sufficiently low, initially. In an event of fading in one of the communication links, for example as demonstrated in FIG. 3, the receiver of the faded signal may be interfered by the other signal and its quality may be degraded beyond an acceptable level.

In some embodiments, information regarding the degradation is optionally provided to a controller, which may optionally decide to split the channel into two non-overlapping channels. As described previously, with reference to FIGS. 4E and 4F, channel splitting can be done in a frequency domain or in a time domain.

A down side of channel splitting is that communication rate is reduced to half.

Interfering Signal Attenuation

In some embodiments, still referring to the above-mentioned example scenario, reducing the channel bandwidth by a factor of 2 (channel splitting) is too extreme, and a softer response is optionally selected. The controller optionally instructs a transmitter which transmits the interfering signal to reduce its power level. As a result communication rate for the interfering signal is reduced, but possibly less than it would have been reduced if channel splitting had been used.

For example, consider a constellation of 1024 QAM (10 bits/symbol).

When channel bandwidth (or transmission time) is split into 2, we have a communication rate equivalent to 32 QAM (5 bits/symbol).

Alternatively, reducing the interference power by 12 dB roughly requires using a smaller constellation of 64 QAM (6 bits/symbol). If this reduction in interference power is sufficient, then the reduction in communication rate is lower than channel splitting.

Selection of a Modulation Scheme

It is possible to use a variety of modulation methods, such as OFDM, CPM, PSK and QAM. QAM modulation is now described, for example, as being used for the wireless links. QAM modulations offer high spectral efficiency, higher than the other alternatives mentioned. OFDM and general multi-carrier modulations require a cyclic prefix (or equivalent) and pilot symbols distributed both in time and frequency. QAM modulations require none of these and thus save spectral resources. In addition, QAM modulations present a lower peak-to-average power ratio, enabling a higher transmission power. Finally, QAM modulations are less sensitive to phase noise as compared with OFDM. Both CPM and PSK modulations present a higher sensitivity to noise, especially for large constellations. The above-mentioned reasons motivate using QAM modulations for cellular backhaul applications. Despite superior efficiency of QAM, embodiments of the invention can be applied to any of the mentioned modulation formats.

Uniqueness

There should be no confusion between assigning FFT tones to an OFDM user and selecting a frequency channel as described in this invention. FFT tones may be modified within a channel, and embodiments described here discuss switching a frequency of an entire channel. In some embodiments, assigning frequency channels is performed for nodes in a network which spans a geographic range which can range from less than a kilometer to tens and hundreds of kilometers. The network includes point-to-point links with possibly mutual interference due to the geometry of the links.

A non-limiting discussion of potential benefits of using a controller for management of transmission parameters in a multi-link wireless transmission network, over managing the transmission network one link at a time is now detailed, by way of a non-limiting example with reference to existing channel allocation in cellular networks. When a base-station assigns a frequency channel to be used it is done locally without seeing a whole multi-link network, while in example embodiments of the invention a central controller sees all the network links and can potentially assigns channels accordingly, potentially lowering overall interference and/or increasing overall throughput. A method for allocating channels according to an example embodiment of the invention is a centralized method in contrast to a distributed method used by base-stations.

In some embodiments, the method described here is based on a geometric model of the network for initial assignment of frequencies. Cellular networks typically assign channels to users without a geometric model, sometimes optionally based on signal quality measurement only.

In some embodiments of the invention a larger geographic span is potentially covered than for base stations, since a whole network is viewed—not just a single link.

In some embodiments, the communication network uses single-carrier modulation, and a network using single-carrier modulation does not split a channel into sub-channels. An example embodiment of a controller assigns a whole channel to a link, in contrast, for example, to a base-station in a cellular network, which communicates with subscribers using a predetermined channel, yet splits the predetermined channel into subcarriers and allocates the subcarriers dynamically to users communicating with the base station.

It is expected that during the life of a patent maturing from this application many relevant transmission parameters will be developed with reference to transmission channels and the scope of the term transmission parameter is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for a network controller to carry out automatic channel allocation for a network of wireless communication links between communication nodes, the method comprising:
   determining an estimated signal attenuation between communication nodes in a network;
   allocating wireless channels, determined by a set of transmission parameters, to a plurality of wireless communication links in said network, based, at least in part, on said estimated signal attenuation;
   sending a message to a first communication node, said message instructing said first communication node to use a set of transmission parameters for communicating a first wireless communication link connecting said first communication node to a second communication node at an opposite end of said first wireless communication link, said transmission parameters based, at least in part, on said allocating wireless channels,
   in which said determining estimated signal attenuation between a plurality of wireless communication nodes in said network comprises:
   receiving a report from said second communication node in said network, said report including data describing attenuation of a signal on a wireless communication link between said first communication node and said second communication node; and
   said network controller determining estimated signal attenuation over said wireless communication link between said first communication node and said second communication node based, at least in part, on said report,
   and further comprising:
   receiving a report from a third communication node, said third communication node not connected by an intended wireless communication link to said first communication node, said report including data describing attenuation of a signal from said first communication node and received by said third communication node;
   making a determination that said attenuation between said first communication node and said third communication node is lower than a threshold.

2. The method of claim 1, in which said network of wireless communication links comprises a cellular backhaul network.

3. The method of claim 1, in which a plurality of wireless communication links in said network use a same frequency.

4. The method of claim 1, in which a plurality of wireless communication links in said network use a same set of transmission parameters.

5. The method of claim 1 and further comprising:
   sending a message to said first communication node to change transmission parameters of said wireless communication link between said first communication node and said second communication node so as to increase attenuation between said first communication node and said third communication node.

6. The method of claim 1 and further comprising:
sending a message to said first communication node to split a communication channel between said first communication node and said second communication node into two non-overlapping communication channels.

7. The method of claim 1 and further comprising:
sending a message to said third communication node to switch to a communication scheme which is less sensitive to interference.

8. The method of claim 7 in which switching to a communication scheme which is less sensitive to interference is performed by changing at least one of the following communication parameters:
reducing a constellation size; and
reducing a coding rate.

9. The method of claim 1, in which said allocating wireless channels is based, at least in part, on setting mutual interference between said wireless communication links below a threshold level.

10. The method of claim 1, in which said allocating wireless channels is based, at least in part, on minimizing mutual interference between a plurality of said wireless communication links.

11. The method of claim 1, in which said determining estimated signal attenuation over a plurality of wireless communication links between a plurality of communication nodes is based on using at least one parameter selected from a group consisting of:
transmitter antenna shape;
receiver antenna shape;
transmitter antenna model;
receiver antenna model;
transmitter antenna diameter;
receiver antenna diameter;
angle of receiver antenna from direction of transmission of transmitter antenna;
angle of receiver antenna direction from direction of transmission of transmitter antenna;
power of transmission signal;
modulation of signal;
polarization of signal;
frequency band;
geographic region; and
real-time weather information.

12. The method of claim 1, in which said allocating channels comprise dynamic allocation, and further comprising:
instructing at least one of said wireless communication links to change a transmission parameter in said wireless communication link, thereby decreasing mutual interference between at least one pair of wireless communication links in said network of wireless communication links.

13. The method of claim 12 and further comprising:
receiving a report of a change in signal quality in a wireless communication link from a communication node in said network;
re-allocating channels in said network of wireless communication links depending on said change in signal quality; and
instructing at least one of said wireless communication nodes to change a transmission parameter in said wireless communication link based on said re-allocating channels.

14. The method of claim 13, in which said report comprises data indicating which transmitter interferes with reception of a channel allocated to a wireless communication link associated with said communication node.

15. The method of claim 13 and further comprising:
transmitting identifying codes by respective transmitters in said communication nodes, therewith to identify which of said respective transmitters interfere with reception of a channel allocated to said first communication node.

16. The method of claim 1, in which the determining estimated signal attenuation between said communication nodes further comprises storing attenuation values in a matrix in which an element (i, j) of said matrix represents attenuation between a transmitting communication node i and a receiving communication node j.

17. The method of claim 16 and further comprising:
reporting a change in signal quality at a communication node; and
updating a corresponding value in said matrix.

18. The method of claim 1, in which said transmission parameters comprise a direction of transmission polarization.

19. The method of claim 1, in which said first communication node receiving said message coordinates channel switching with said second communication node to avoid loss of transmitted data.

20. The method of claim 1, in which said first communication node receiving said message coordinates channel switching with said second communication node to avoid loss of synchronization.

21. The method of claim 1 and further comprising:
adding a new channel to the plurality of wireless communication links;
determining a new set of transmission parameters for use in said new channel;
sending a message to at least one communication node, said message instructing said communication node to use the new set of transmission parameters for communicating on said new channel.

22. The method of claim 1 and further comprising:
said first communication node switching transmission parameters for communicating on said first wireless communication link errorlessly, based, at least in part, on said message instructing said first communication node to use said set of transmission parameters.

23. The method of claim 1 and further comprising:
said first communication node switching transmission frequency for communicating on said first wireless communication link errorlessly, based, at least in part, on said message instructing said first communication node to use said transmission frequency.

24. Non-transitory computer-readable medium containing instructions for implementing the method of claim 1.

25. A method for a network controller to carry out automatic channel allocation for a network of wireless communication links between communication nodes, the method comprising:
determining an estimated signal attenuation between communication nodes in a network;
allocating wireless channels, determined by a set of transmission parameters, to a plurality of wireless communication links in said network, based, at least in part, on said estimated signal attenuation;
sending a message to a first communication node, said message instructing said first communication node to use a set of transmission parameters for communicating a first wireless communication link connecting said first communication node to a second communication node at an opposite end of said first wireless communication link, said transmission parameters based, at least in part, on said allocating wireless channels, and further comprising:

removing a channel from said plurality of wireless communication links;

calculating estimated signal attenuation between a remainder of the plurality of wireless communication links;

determining at least one new set of transmission parameters for use in at least one channel in the plurality of wireless communication links; and sending a message to a communication node, the message instructing the communication node to use the new set of transmission parameters in the at least one channel in the plurality of wireless communication links.

26. Non-transitory computer-readable medium containing instructions for implementing the method of claim 25.

27. The method of claim 25, in which said network of wireless communication links comprises a cellular backhaul network.

28. The method of claim 25, in which a plurality of wireless communication links in said network use a same frequency.

29. The method of claim 25, in which a plurality of wireless communication links in said network use a same set of transmission parameters.

30. A method for automatic channel allocation for a plurality of wireless communication links between a plurality of communication nodes, comprising:

entering values in a transmission attenuation table in a network controller with table elements such that a table element (i, j) represents estimated transmission attenuation between a transmitting communication node i and a receiving communication node j;

allocating channels to the plurality of wireless communication links based, at least in part, on corresponding entries in the transmission attenuation table;

sending a message to a first communication node, said message instructing said first communication node to use one of said allocated channels for communicating on a wireless communication link connecting said first communication node to a second communication node, and further comprising:

providing a digital representation of a map of locations of the plurality communication nodes;

providing at least one digital representation of a graph of power transmission as a function of angle for a transmission antenna over said plurality of wireless communication links; and in which the network controller determines estimated signal attenuation between a plurality of wireless communication links based, at least in part, on the digital representation of the graph and the digital representation of the map.

31. Non-transitory computer-readable medium containing instructions for implementing the method of claim 30.

* * * * *